US007466411B2

(12) United States Patent
Riley et al.

(10) Patent No.: US 7,466,411 B2
(45) Date of Patent: Dec. 16, 2008

(54) REPLACEMENT AND ALIGNMENT OF LASER

(75) Inventors: Brian S. Riley, Firestone, CO (US); Aaron Wegner, Longmont, CO (US)

(73) Assignee: Inphase Technologies, Inc., Longmont, CO (US)

( * ) Notice: Subject to any disclaimer, the term of this patent is extended or adjusted under 35 U.S.C. 154(b) by 0 days.

(21) Appl. No.: 11/440,368

(22) Filed: May 25, 2006

(65) Prior Publication Data

US 2006/0279820 A1  Dec. 14, 2006

Related U.S. Application Data

(60) Provisional application No. 60/684,531, filed on May 26, 2005.

(51) Int. Cl.
*G01B 11/00* (2006.01)
(52) U.S. Cl. ..................................................... 356/399
(58) Field of Classification Search ......... 356/399–401, 356/614
See application file for complete search history.

(56) References Cited

U.S. PATENT DOCUMENTS

| | | | |
|---|---|---|---|
| 3,612,698 A * | 10/1971 | Mathisen ................ | 356/139.05 |
| 4,103,998 A * | 8/1978 | Nakazawa et al. ...... | 356/139.07 |
| 4,631,416 A * | 12/1986 | Trutna, Jr. .................... | 250/548 |
| 4,780,617 A * | 10/1988 | Umatate et al. ............. | 250/548 |
| 5,066,088 A | 11/1991 | Davies et al. | |
| 5,123,073 A | 6/1992 | Pimpinella | |
| 5,194,744 A * | 3/1993 | Aoki et al. .................. | 250/548 |
| 5,365,342 A * | 11/1994 | Ayata et al. ................. | 356/401 |
| 5,499,732 A | 3/1996 | Nishimoto | |
| 5,500,910 A | 3/1996 | Boudreau et al. | |
| 5,563,702 A * | 10/1996 | Emery et al. ................... | 356/73 |

(Continued)

FOREIGN PATENT DOCUMENTS

WO  WO 2005/059902 A3  6/2005

OTHER PUBLICATIONS

Y. Nakayama, et al., "Diffuser with Pseudorandom Phase Sequence," *Opt. Soc. Am.*, vol. 69 (No. 10), (Oct. 1979), pp. 1367-1372.

(Continued)

*Primary Examiner*—Tarifur R. Chowdhury
*Assistant Examiner*—Isiaka O Akanbi
(74) *Attorney, Agent, or Firm*—Jagtiani + Guttag

(57) ABSTRACT

The present invention relates to embodiments of: (1) a unitary holographic drive head assembly mounting structure; (2) an assembly comprising a unitary holographic drive head assembly mounting structure and a plurality of holographic drive head components and/or subassemblies; (3) a subassembly comprising a spatial light modulator, detector array, and a beam splitter; (4) a device comprising a spatial light modulator and a physical aperture positioned over or an imaged aperture projected onto the photoactive area of the spatial light modulator; (5) a system for optically aligning or pointing a laser in a holographic drive head assembly; (6) a light source subassembly comprising a laser, a fiber coupling lens; and an optical fiber having a fiber connector ready output end; and (7) a light source subsystem comprising a laser source, beam conditioning optics, fiber coupling optics for receiving the conditioned light beam, and a fiber optic connector for receiving the conditioned light beam from the fiber coupling optics.

25 Claims, 18 Drawing Sheets

U.S. PATENT DOCUMENTS

| | | | |
|---|---|---|---|
| 5,692,083 | A | 11/1997 | Bennett |
| 5,710,672 | A | 1/1998 | Roberts et al. |
| 5,719,691 | A | 2/1998 | Curtis et al. |
| 5,886,971 | A | 3/1999 | Feldman et al. |
| 5,912,872 | A | 6/1999 | Feldman et al. |
| 5,932,045 | A | 8/1999 | Campbell et al. |
| 5,956,106 | A | 9/1999 | Petersen et al. |
| 6,081,381 | A | 6/2000 | Shalapenok et al. |
| 6,103,454 | A | 8/2000 | Dhar et al. |
| 6,104,690 | A | 8/2000 | Feldman et al. |
| 6,137,601 | A | 10/2000 | Khoury et al. |
| 6,265,240 | B1 | 7/2001 | Dautartas et al. |
| 6,344,148 | B1 | 2/2002 | Park et al. |
| 6,389,045 | B1 | 5/2002 | Mann et al. |
| 6,482,551 | B1 | 11/2002 | Dhar et al. |
| 6,650,447 | B2 | 11/2003 | Curtis et al. |
| 6,693,712 | B1 * | 2/2004 | Trezza .................. 356/399 |
| 6,743,552 | B2 | 6/2004 | Setthachayanon et al. |
| 6,747,257 | B1 | 6/2004 | Farnsworth et al. |
| 6,765,061 | B2 | 7/2004 | Dhar et al. |
| 6,768,426 | B2 | 7/2004 | Nekado et al. |
| 6,780,546 | B2 | 8/2004 | Trentler et al. |
| 6,796,697 | B1 | 9/2004 | Bragg et al. |
| 6,862,121 | B2 | 3/2005 | Psaltis et al. |
| 6,882,430 | B2 * | 4/2005 | Hill ..................... 356/496 |
| 6,909,529 | B2 | 6/2005 | Curtis |
| 6,925,225 | B2 | 8/2005 | Engel et al. |
| 6,956,998 | B2 | 10/2005 | Shahar et al. |
| 6,958,805 | B2 * | 10/2005 | Kim ...................... 355/67 |
| 6,992,805 | B2 | 1/2006 | Ingwall et al. |
| 7,027,197 | B2 | 4/2006 | Newswanger et al. |
| 2003/0206320 | A1 | 11/2003 | Cole et al. |
| 2004/0027625 | A1 | 2/2004 | Trentler et al. |
| 2004/0027668 | A1 | 2/2004 | Ayres |
| 2004/0223330 | A1 | 11/2004 | Broude et al. |
| 2005/0013231 | A1 | 1/2005 | Kawano et al. |
| 2005/0041000 | A1 | 2/2005 | Plut |
| 2005/0141810 | A1 | 6/2005 | Vaez-Iravani et al. |
| 2005/0146762 | A1 | 7/2005 | Hoogland et al. |
| 2005/0190451 | A1 | 9/2005 | Hansen |
| 2005/0270855 | A1 | 12/2005 | Earhart et al. |
| 2005/0270856 | A1 | 12/2005 | Earhart et al. |
| 2005/0286388 | A1 | 12/2005 | Ayres et al. |
| 2006/0274393 | A1 | 12/2006 | Fotheringham et al. |
| 2006/0274394 | A1 | 12/2006 | Riley et al. |
| 2006/0275670 | A1 | 12/2006 | Riley et al. |
| 2006/0279818 | A1 | 12/2006 | Ayres et al. |
| 2006/0279819 | A1 | 12/2006 | Krneta et al. |
| 2006/0279820 | A1 | 12/2006 | Riley et al. |
| 2006/0279821 | A1 | 12/2006 | Riley et al. |
| 2006/0279822 | A1 | 12/2006 | Krneta et al. |
| 2006/0279823 | A1 | 12/2006 | Riley et al. |
| 2006/0279824 | A1 | 12/2006 | Riley et al. |
| 2006/0280096 | A1 | 12/2006 | Riley et al. |
| 2006/0281021 | A1 | 12/2006 | Riley et al. |
| 2006/0291022 | A1 | 12/2006 | Redmond et al. |
| 2006/0291023 | A1 | 12/2006 | Riley et al. |

OTHER PUBLICATIONS

Smothers, et al., "Photopolymers for Holography," *SPIE OE/Laser Conference*, (Los Angeles, Calif., 1990), pp. 1212-03.

Psaltis, et al., "Holographic Memories," *Scientific American*, Nov. 1995.

Dhar, L., et al., "Recording Media That Exhibit High Dynamic Range for Holographic Storage," *Optics Letters*, 24, (1999): pp. 487 et. seq.

Dickey, "Laser Beam Shaping," Optics & Photonics News (Apr. 2003), pp. 30-35.

Masters, A., et al., "Beam-Shaping Optics Expand Excimer Laser Applications," Laser Focus World (Jun. 2005).

Fuertes, J.M., et al., "Absolute Type Shaft Encoding Using LFSR Sequences With Prescribed Length".

McLeod, et al. "Micro-Holographic Multi-Layer Optical Disk Data Storage," *International Symposium on Optical Memory and Optical Data Storage* (Jul. 2005).

Shelby, "Media Requirements for Digital Holographic Data Storage," *Holographic Data Storage*, Section 1.3 (Coufal, Psaltis, Sincerbox Eds. 2003).

\* cited by examiner

REPLACEMENT AND ALIGNMENT OF LASER

CROSS-REFERENCE TO RELATED APPLICATIONS

This application makes reference to and claims the benefit of the following co-pending U.S. Provisional Patent Application No. 60/684,531 filed May 26, 2005. The entire disclosure and contents of the foregoing Provisional Application is hereby incorporated by reference. This application also makes reference to the following co-pending U.S. Patent Applications. The first application is U.S. application Ser. No. 11/440,370, entitled "Illuminative Treatment of Holographic Media," filed May 25, 2006. The second application is U.S. application Ser. No. 11/440,446, entitled "Methods and Systems for Laser Mode Stabilization," filed May 25, 2006. The third application is U.S. application Ser. No. 11/440,447, entitled "Phase Conjugate Reconstruction of Hologram," filed May 25, 2006. The fourth application is U.S. application Ser. No. 11/440,448, entitled "Improved Operational Mode Performance of a Holographic Memory System," filed May 25, 2006. The fifth application is U.S. application Ser. No.11/440,359, entitled "Holographic Drive Head and Component Alignment," filed May 25, 2006. The sixth application is U.S. application Ser. No. 11/440,358, entitled "Optical Delay Line in Holographic Drive," filed May 25, 2006. The seventh application is U.S. application Ser. No. 11/440,357, entitled "Controlling the Transmission Amplitude Profile of a Coherent Light Beam in a Holographic Memory System," filed May 25, 2006. The eighth application is U.S. application Ser. No. 11/440,372, entitled "Sensing Absolute Position of an Encoded Object," filed May 25, 2006. The ninth application is U.S. application Ser. No. 11/440,371, entitled "Sensing Potential Problems in a Holographic Memory System," filed May 25, 2006. The tenth application is U.S. application Ser. No. 11/440,367, entitled "Post-Curing of Holographic Media," filed May 25, 2006. The eleventh application is U.S. application Ser. No. 11/440,366, entitled "Erasing Holographic Media," filed May 25, 2006. The twelfth application is U.S. application Ser. No. 11/440,365, entitled "Laser Mode Stabilization Using an Etalon," filed May 25, 2006. The thirteenth application is U.S. application Ser. No. 11/440,369, entitled "Holographic Drive Head Alignments," filed May 25, 2006. The fourteenth application is U.S. application Ser. No. 11/440,368, entitled "Replacement and Alignment of Laser," filed May 25, 2006. The entire disclosure and contents of the foregoing U.S. patent applications are hereby incorporated by reference.

BACKGROUND

1. Field of the Invention

The present invention broadly relates to: (1) holographic drive head and component alignment using a unitized mounting structure; (2) alignment of certain holographic drive head components; and (3) replacement and alignment of the laser in a holographic drive head.

2. Related Art

Developers of information storage devices and methods continue to seek increased storage capacity. As part of this development, holographic memory systems have been suggested as alternatives to conventional memory devices. Holographic memory systems may be designed to record data one bit of information (i.e., bit-wise data storage). See McLeod et al. "Micro-Holographic Multi-Layer Optical Disk Data Storage," *International Symposium on Optical Memory and Optical Data Storage* (July 2005). Holographic memory systems may also be designed to record an array of data that may be a 1-dimensional linear array (i.e., a 1×N array, where N is the number linear data bits), or a 2-dimension array commonly referred to as a "page-wise" memory systems. Page-wise memory systems may involve the storage and readout of an entire two-dimensional representation, e.g., a page of data. Typically, recording light passes through a two-dimensional array of high and low transparency areas representing data, and the system stores, in three dimensions, the pages of data holographically as patterns of varying refractive index imprinted into a storage medium. See Psaltis et al., "Holographic Memories," *Scientific American*, November 1995, where holographic systems are discussed generally, including page-wise memory systems.

In a holographic data storage system, information is recorded by making changes to the physical (e.g., optical) and chemical characteristics of the holographic storage medium. These changes in the holographic medium take place in response to the local intensity of the recording light. That intensity is modulated by the interference between a data-bearing beam (the data beam) and a non-data-bearing beam (the reference beam). The pattern created by the interference of the data beam and the reference beam forms a hologram which may then be recorded in the holographic medium. If the data-bearing beam is encoded by passing the data beam through, for example, a spatial light modulator (SLM), the hologram(s) may be recorded in the holographic medium as an array of light and dark squares or pixels. The holographic medium or at least the recorded portion thereof with these arrays of light and dark pixels may be subsequently illuminated with a reference beam (sometimes referred to as a reconstruction beam) of the same or similar wavelength, phase, etc., so that the recorded data may be read.

Holographic data storage systems often comprise a holographic drive head assembly that is used in recording (writing) holograms to and to reading (reconstructing) holograms from a holographic storage medium. This holographic drive head assembly may comprise a variety of optical, optomechanical, optoelectrical and eletromechanical components. For example, these holographic drive head components may include lasers, beam splitters, lenses and lens arrays (e.g., Fourier Transform focusing/storage lens, expander lenses, relays, scanner lens, etc.), phasemasks, encoders (e.g., spatial light modulators), detector arrays (e.g., cameras), waveplates, filters, mirrors, galvanometers (glavos), etc. Each of these holographic drive head components may be mounted as separate components or may be combined into subassemblies comprising a plurality of components.

The design of such holographic drive head assemblies has traditionally been very complicated and complex. The individual components or subassemblies of such components of the holographic head drive assembly may be mounted on many square feet of a sophisticated optical breadboard. The use of such large optical breadboards may be necessitated by the need to meticulously align the various components using large sized optical test equipment. Because of the extreme sensitivity of the optical alignment of such assemblies, a vibration isolation system may be required for the optical breadboard. Meticulous alignment of the many components and elements of the holographic drive head assembly may also be difficult and time consuming to achieve. In addition, the use of such large optical breadboards may be impractical for commercial holographic storage systems.

Previously, holographic drive head assemblies have also required precise alignment of the detector or sensor array (e.g., camera) for the reconstructed beam in multiple degrees of freedom to attain the necessary relationship with the spatial light modulator (SLM). This alignment procedure may be time consuming and may necessitate complicated hardware to attain the level of adjustment needed or desired. Realignment of this subassembly may also be required if the camera, SLM or both need to be replaced because of failure, malfunction, damage, etc. In addition, reflections, for example, from bonding wires, pads, unused border pixels, etc., on the SLM may result in unwanted noise signals in the holograms that are written on the holographic storage medium which may degrade the overall signal to noise ratio (SNR) of recovered holograms when read or reconstructed. Such reflections may also contribute to the problem of holographic drive head alignment.

Holographic drive head assemblies often use a primary laser, which generates a primary coherent light beam. This primary coherent light beam may be split into a plurality of beams (e.g., a data beam and a reference beam) which are used, for example, to record/write holograms to and to read/reconstruct holograms from the storage medium. It may be necessary to replace the primary laser due to laser failure, malfunction, damage, etc. Because the primary laser may be the first optical component in a chain of optical components or subassemblies of the holographic drive head assembly, replacing the primary laser may require the realignment of all of the other components and/or subassemblies of the holographic drive head assembly. This may be a very tedious and time consuming task to achieve. The optical path of the primary laser may also require monitoring of its alignment. The primary coherent light beam generated by the laser may also be susceptible to pointing errors due changes in the ambient temperature, wavelength, electrical current supplied, etc.

Accordingly, what may be needed are ways to: (1) more easily align the various components and/or subassemblies of a holographic drive head assembly; (2) reduce the size of the structure for mounting these various components and/or subassemblies of a holographic drive head assembly; (3) provide a mounting structure for the various components and/or subassemblies which minimizes, reduces, eliminates, etc., vibrations that may affect the optical alignment of the holographic drive head assembly; (4) more easily and precisely align the camera with the SLM, as well as to allow for easy replacement thereof without the need of realignment; (5) minimize, reduce, eliminate, etc., reflections on the SLM; and (6) more easily replace the primary laser without requiring tedious and timing consuming realignment of the other components and/or subassemblies of the holographic drive head assembly.

SUMMARY

According to a first broad aspect of the present invention, there is provided an article comprising
a unitary holographic drive head assembly mounting structure having sufficient rigidity to minimize motion effects on optical alignment of holographic drive head assembly components and/or subassemblies mounted on the mounting structure;
the mounting structure having a plurality of preselected locations for mounting holographic drive head components and/or subassemblies requiring optical alignment; and
passive alignment means associated with one or more of the preselected locations for optically aligning the holographic drive head components and/or subassemblies.

According to a second broad aspect of the present invention, there is provided an assembly comprising:
a unitary holographic drive head assembly mounting structure having:
sufficient rigidity to minimize motion effects on optical alignment of holographic drive head assembly components and/or subassemblies mounted on the mounting structure;
a plurality of preselected locations for mounting holographic drive head components and/or subassemblies requiring optical alignment; and
passive alignment means associated with one or more of the preselected locations for optically aligning the holographic drive head components and/or subassemblies; and
a plurality of holographic drive head components and/or subassemblies, each of the holographic drive head components and/or subassemblies being mounted at one of the preselected locations.

According to a third broad aspect of the present invention, there is provided a unitized subassembly comprising:
a spatial light modulator;
a detector array;
a beam splitter; and
means for associating the spatial light modulator and the detector array to the beam splitter so that the spatial light modulator and the detector array are optically and mechanically aligned with respect to each other.

According to a fourth broad aspect of the present invention, there is provided a device comprising:
a spatial light modulator having a photoactive area; and
a physical aperture having high absorption positioned over the photoactive area or an imaged aperture imaged onto the photoactive area;
wherein the physical or imaged aperture reduces reflections in the photoactive area which cause degradation of the signal to noise ratio of a recorded hologram.

According to a fifth broad aspect of the present invention, there is provided a system comprising one or more of the following components for optically aligning or pointing a laser in a holographic drive head assembly with respect to an optical path:
a pair of independent optical path bending or altering elements positioned in the optical path after the laser and before the next optical component or subassembly in the optical path;
a spatial filter having associated therewith a pinhole through which light generated by the laser may pass, wherein the amount of light passing through the pinhole is used to determine the optical alignment of the laser with respect to the optical path;
one or more alignment apertures positioned in an optical path after the laser, wherein the alignment apertures are used to determine the optical alignment of the laser with respect to the optical path; or
means for splitting off a portion of the light generated by the laser to provide a monitoring beam, and means for analyzing the monitoring beam to determine whether the laser is optically aligned or pointing correctly.

According to a sixth broad aspect of the present invention, there is provided a laser light source subassembly comprising:
a laser;
a fiber coupling lens connected to the laser; and
an optical fiber having an input end connected to the fiber coupling lens and a fiber connector ready output end.

According to a seventh broad aspect of the present invention, there is provided a light source subsystem comprising:
- a laser source providing a light beam;
- beam conditioning optics for conditioning the light beam to provide a conditioned light beam;
- fiber coupling optics for receiving the conditioned light beam; and
- a fiber optic connector having an input end and an output end, wherein the input end receives the conditioned light beam from the fiber coupling optics.

BRIEF DESCRIPTION OF THE DRAWINGS

The invention will be described in conjunction with the accompanying drawings, in which.

DETAILED DESCRIPTION

Figure 1:
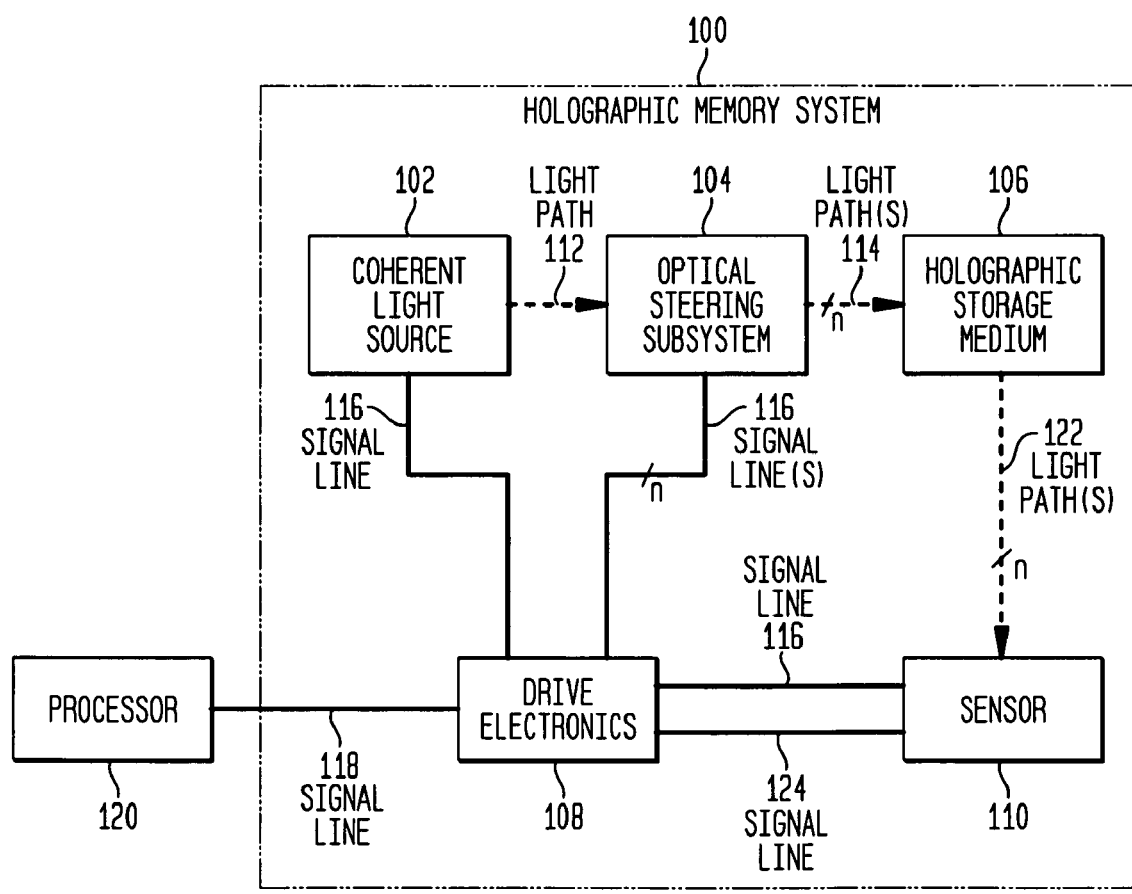
FIG. 1 is a schematic block diagram of an exemplary holographic memory system which may include one or more embodiments of the present invention.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "top", "bottom", "above", "below", "left", "right", "horizontal", "vertical", etc. are merely used for convenience in describing the various embodiments of the present invention. The embodiments of the present invention may be oriented in various ways. For example, the embodiments shown in FIGS. 3 through 12 may be flipped over, rotated by 90° in any direction, etc.

For the purposes of the present invention, the term "laser" refers to conventional lasers, as well as laser diodes (LDs).

For the purposes of the present invention, the term "light source" refers to any source of electromagnetic radiation of any wavelength, for example, from a laser, etc. Suitable light sources for use in embodiments of the present invention include, but are not limited to, those obtained by conventional laser sources, e.g., the blue and green lines of $Ar^+$ (458, 488, 514 nm) and He—Cd lasers (442 nm), the green line of frequency doubled YAG lasers (532 nm), and the red lines of He—Ne (633 nm), $Kr^+$ lasers (647 and 676 nm), and various laser diodes (LDs) (e.g., emitting light having wavelengths of from 290 to 900 nm).

For the purposes of the present invention, the term "spatial light intensity" refers to a light intensity distribution or pattern of varying light intensity within a given volume of space.

For the purposes of the present invention, the terms "holographic grating," "holograph" or "hologram" (collectively and interchangeably referred to hereafter as "hologram") are used in the conventional sense of referring to an interference pattern formed when a signal beam and a reference beam interfere with each other. In cases wherein digital data is recorded, the signal beam may be encoded with a data modulator, e.g., a spatial light modulator, etc.

For the purposes of the present invention, the term "holographic recording" refers to the act of recording a hologram in a holographic recording medium.

For the purposes of the present invention, the term "multiplexing holograms" refers to recording, storing, etc., a plurality of holograms in the same volume or nearly the same volume of the holographic recording medium by varying a recording parameter(s) including, but not limited to, angle, wavelength, phase code, shift, correlation, peristrophic, etc. The multiplexed holograms that are recorded, stored, etc., may be read, retrieved, reconstructed, etc., by using the same recording parameter(s) used to record, store, etc., the respective holograms.

For the purposes of the present invention, the term "holographic recording medium" refers to a component, material, etc., that is capable of recording and storing, in three dimensions (i.e., the X, Y and Z dimensions), one or more holograms as one or more pages as patterns of varying refractive index imprinted into the medium. Examples of holographic media useful herein include, but are not limited to, those described in: U.S. Pat. No. 6,103,454 (Dhar et al.), issued Aug. 15, 2000; U.S. Pat. No. 6,482,551 (Dhar et al.), issued Nov. 19, 2002; U.S. Pat. No. 6,650,447 (Curtis et al.), issued Nov. 18, 2003, U.S. Pat. No. 6,743,552 (Setthachayanon et al.), issued Jun. 1, 2004; U.S. Pat. No. 6,765,061 (Dhar et al.), Jul. 20, 2004; U.S. Pat. No. 6,780,546 (Trentler et al.), issued Aug. 24, 2004; U.S. Patent Application No. 2003-0206320, published Nov. 6, 2003, (Cole et al), and U.S. Patent Application No. 2004-0027625, published Feb. 12, 2004, the entire contents and disclosures of which are herein incorporated by reference.

For the purposes of the present invention, the term "data page" or "page" refers to the conventional meaning of data page as used with respect to holography. For example, a data page may be a page of data (i.e., two-dimensional assembly of data), one or more pictures, etc., to be recorded in a holographic recording medium.

For the purposes of the present invention, the term "recording light" refers to a light source used to record into a holographic recording medium. The spatial light intensity pattern of the recording light is what is recorded.

For the purposes of the present invention, the term "recording data" refers to storing or writing holographic data in a holographic medium.

For the purposes of the present invention, the term "reading data" refers to retrieving, recovering, or reconstructing holographic data stored in a holographic medium.

For the purposes of the present invention, the term "data modulator" refers to any device that is capable of optically representing data in one or two-dimensions from a signal beam.

For the purposes of the present invention, the term "spatial light modulator" (SLM) refers to a data modulator device that is an electronically controlled, active optical element.

For the purposes of the present invention, the term "refractive index profile" refers to a two-dimensional (X, Y) mapping of the refractive index pattern recorded in a holographic recording medium.

For the purposes of the present invention, the term "data beam" refers to a recording beam containing a data signal. As used herein, the term "data modulated beam" refers to a data beam that has been modulated by a modulator such as a spatial light modulator (SLM).

For the purposes of the present invention, the term "optical element" refers to any component or plurality of components that affect the phase of the light, including, but not limited to, the spatial location of the light, the angle of the light, etc.

For the purposes of the present invention, the term "reflective optical element" refers to an optical element that reflects incident light.

For the purposes of the present invention, the term "transmissive optical element" refers to an optical element that allows incident light to pass therethrough.

For the purposes of the present invention, the term "noise" refers to any undesirable optical signal that may cause a loss in the desired fidelity of the signal, including, but not limited to, coherent noise, incoherent noise, interference fringes, etc.

For the purposes of the present invention, the term "assembly" refers to an association or combination of one or more individual components or subassemblies.

For the purposes of the present invention, the term "subassembly" refers to an association or combination of one or more individual components which function as a unitary or unified component.

For the purposes of the present invention, the term "component" refers to an individual element, structure, device, etc.

For the purposes of the present invention, the term "holographic drive head assembly" refers to those components, subassemblies, mounting structures, etc., of a holographic memory system which are primarily used to record (write) holograms to and/or read (reconstruct) holograms from the holographic storage medium. The components, subassemblies, etc., of the holographic drive head assembly may include lasers, beam splitters, lenses and lens arrays (e.g., Fourier Transform focusing/storage lens, expander lenses, relays, scanner lens, etc.), phasemasks, encoders (e.g., spatial light modulators), detector arrays (e.g., cameras), waveplates, filters, mirrors, galvanometers (glavos), etc., as well as mounting structures, passive alignment elements, etc., for these components and subassemblies.

For the purposes of the present invention, the terms "unitary," "unified" and "unitized" refer to a structure, component or subassembly which functions as a single unit.

For the purposes of the present invention, the term "rigidity" refers to the inflexibility, firmness, stiffness, etc., of a structure, material, etc., which is stiff, unbending, firm, unyielding, etc.

For the purposes of the present invention, the term "motion effects" refer to movement effects caused by external or internal physical vibrations, shaking, shocks, impacts, etc.

For the purposes of the present invention, the terms "optical alignment" and "optically aligned" refer to alignment of components, subassemblies, etc., relative to the optical path.

For the purposes of the present invention, the term "preselected location" refers to a predetermined position, place, spot, etc., where components, subassemblies, etc., are to be or may be mounted in the holographic drive head assembly.

For the purposes of the present invention, the term "plurality" refers to one or more, subassemblies, components, elements, locations, etc., and includes the term multiplicity.

For the purposes of the present invention, the term "passive alignment means" and "passive alignment members" refer to means or members that optically align or maintain optical alignment of components, subassemblies, etc., of the holographic drive head assembly, and/or which restrict undesired motion or movement thereof in one or more specific directions, without active adjustment, movement, motion, etc. Passive alignment members may include defined spaces, such as slots, holes, recesses, grooves, channels, datums, etc., physical elements such as rails, guides, walls, surfaces, mounting blocks, pins, bosses, etc., other passive alignment features, etc., or any combination thereof. The passive alignment members may be of any suitable shape, size, orientation, etc., including V-shaped, C-shaped, L-shaped, U-shaped, cylindrical-shaped, rectangular or box-shaped, squared-shaped, etc. Combinations of passive alignment members may also be used to align or maintain alignment. For example, a plurality of connected or unconnected surfaces which, together, define a particular orientation, shape, configuration, etc., which align or maintain alignment may be used in combination as passive alignment members.

For the purposes of the present invention, the terms "a detector array" or "sensor array" (hereinafter collectively referred to as "detector array") refer to a device which is capable of determining the position of an incident beam or which provides information for determining the position of an incident beam. Detector arrays may include a quad cell, a positioning sensing detector, a camera, etc.

For the purposes of the present invention, the term "optical divider" refers to an optical component or assembly which divides or splits a light beam into at least one or more separate light beams with controlled and possibly adjustable intensities. Optical dividers include beam splitters which may also polarize the split beams, i.e., may be a polarizing beam splitter.

For the purposes of the present invention, the term "means for associating the spatial light modulator and the detector array to the beam splitter" refer to means, members, etc., that associate, attach, secure, mount, etc., the spatial light modulator and the detector array to the beam splitter so that the spatial light modulator and the detector array are optically aligned with respect to each other and may be assembled and aligned into a holographic storage device without additional relative adjustment, movement, motion, etc., between the spatial light modulator, detector array, or beam splitter Association means may include adhesive, bonding agents, mechanical fasteners (e.g., bolts, etc.), mechanical mounting structures, components, elements, frames, or parts (e.g., brackets, blocks, etc.), etc.

For the purposes of the present invention, the term "physical aperture" refers to an aperture formed, defined, made, etc., in a physical component, element, etc.

For the purposes of the present invention, the term "imaged aperture" refers to an image of a light beam as it passes through an aperture which is created, projected, etc., onto a surface, component, element, etc. Imaged apertures may be formed and imaged, projected, etc., onto a surface, component, element, etc., by methods, devices, etc., used to form and image, project, etc., phasemasks onto a surface, component, element, etc.

For the purposes of the present invention, the term "aperture having high absorption" refers to an aperture having a coating, material, texture, etc., or any combination thereof which absorbs substantially all incident light, for example, a sand blasted aluminum with black anodized coating, a black oxide coating on steel, black felt, etc.

For the purposes of the present invention, the term "pinhole" refers to relatively small or fine diameter hole formed, for example, by drilling (e.g., laser drilling), etching, etc. in an element, component, etc. The pinhole may have a diameter of from about 0.5 to about 1000 micrometers, more typically from about 5 to about 25 micrometers.

For the purposes of the present invention, the term "spatial filter" refers to a lens or lens assembly used in conjunction with a pinhole wherein the pinhole is centered on and placed at the focal point of the lens or lens assembly so as to filter the angular spectrum of an incident light beam so that the light beam approximates a point source of light.

For the purposes of the present invention, the term "optical path" refers to the nominal path a light beam is designed to travel as it propagates between and/or through various optical components and/or subassemblies, for example, lenses, mirrors, prisms, beam splitters, etc.

For the purposes of the present invention, the term "pointing" with regard to a laser or laser beam refers to the angular direction in which the laser beam propagates through space.

For the purposes of the present invention, the terms "fiber coupling optics" or "fiber coupling lens" refer to a lens or lens assembly which is capable of, or used for, focusing a light beam onto the end of an optical fiber placed at the focal point of that lens or lens assembly and with the appropriate numerical aperture to be coupled into the optical fiber. The numerical aperture may be defined as the sine of half the cone angle of the focused light beam.

For the purposes of the present invention, the term "optical fiber" refers to a flexible filament of glass which may be surrounded by a cladding of material with a different index of refraction so as to cause a portion or all of the light rays incident on the end of the optical fiber (and within a particular numerical aperture) to propagate along the optical fiber via total internal reflection. This numerical aperture (NA) of an optical fiber may be defined in terms of the indices of refraction of the core and cladding of the fiber. Specifically, the acceptance NA may be defined as the square root of the difference between the square of the core refractive index (CoreRI) and the square of the cladding refractive index (CladRI), or in other words $NA=[(CoreRI)^2-(CladRI)^2]^{1/2}$.

For the purposes of the present invention, the term "input end" refers to the end of an optical fiber wherein light rays enter the fiber, while the "output end" refers to the end of the optical fiber from which light rays exit the fiber.

For the purposes of the present invention, the term "fiber connector ready output end" refers to an output end of an optical fiber which is encased in a standard fiber optic connector such as, for example, FC-PC, FC-APC, FC-ST, F-SMA, etc.

For the purposes of the present invention, the term "mode" refers to the number of local maxima of the electric and magnetic fields in the direction of oscillation, transverse to light beam.

For the purposes of the present invention, the term "single-mode" refers to a light beam with electric and magnetic field components having only a single local maximum in the transverse directions, also known as TEM00 light beams.

Description of Holographic Memory System Generally

FIG. 1 is a block diagram of an exemplary holographic memory system in which embodiments of the present invention may be used. Although embodiments of the present invention may be described in the context of the exemplary holographic memory system shown in FIG. 1, the present invention may also be implemented in connection with any system now or later developed that implements holographics.

Holographic memory system 100 ("HMS 100" herein) receives along signal line 118 signals transmitted by an external processor 120 to read and write data to a photosensitive holographic storage medium 106. As shown in FIG. 1 processor 120 communicates with drive electronics 108 of HMS 100. Processor 120 transmits signals based on the desired mode of operation of HMS 100. For ease of description, the present invention will be described with reference to read and write operations of a holographic system. However, that the present invention may be applied to other operational modes of a holographic system, such as Pre-Cure, Post-Cure, Write Verify, or any other operational mode implemented now or in the future in an holographic system.

Using control and data information from processor 120, drive electronics 108 transmit signals along signal lines 116 to various components of HMS 100. One such component that may receive signals from drive electronics 108 is coherent light source 102. Coherent light source 102 may be any light source known or used in the art that produces a coherent light beam. In one embodiment, coherent light source 102 may be a laser.

The coherent light beam from coherent light source 102 is directed along light path 112 into an optical steering subsystem 104. Optical steering subsystem 104 directs one or more coherent light beams along one or more light paths 114 to holographic storage medium 106. In the write operational mode described further below at least two coherent light beams are transmitted along light paths 114 to create an interference pattern in holographic storage medium 106. The interference pattern induces alterations in storage medium 106 to form a hologram.

In the read operational mode, holographically-stored data is retrieved from holographic storage medium 106 by projecting a reconstruction or probe beam along light path 114 into storage medium 106. The hologram and the reconstruction beam interact to reconstruct the data beam which is transmitted along light path 122. The reconstructed data beam may be detected by a sensor 110. Sensor 110 may be any type of detector known or used in the art. In one embodiment, sensor 110 may be a camera. In another embodiment, sensor 110 may be a photodetector.

The light detected at sensor array 110 is converted to a signal and transmitted to drive electronics 108 via signal line 124. Processor 120 then receives the requested data or related information from drive electronics 108 via signal line 118.

Figure 2A:
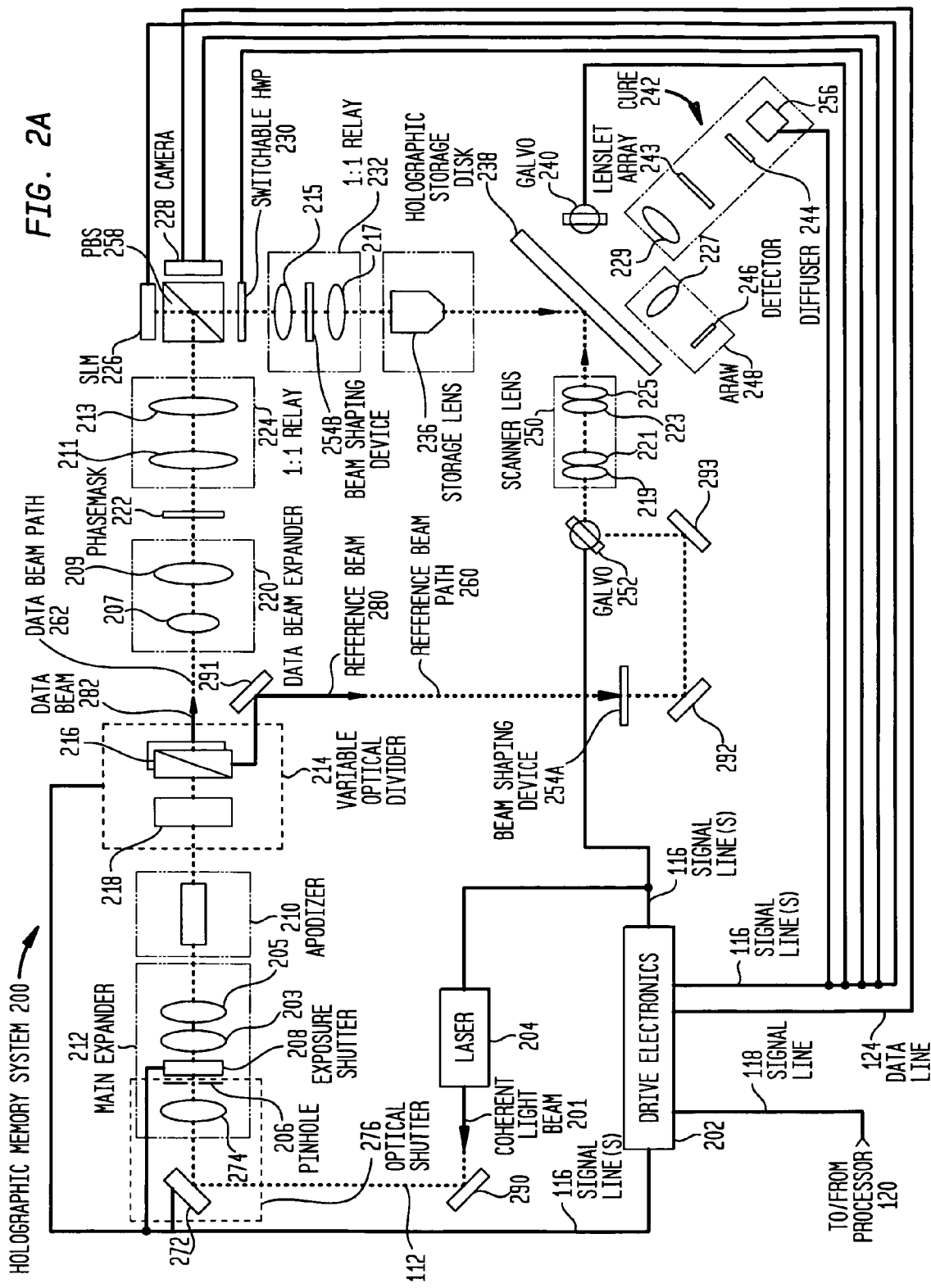
FIG. 2A is an architectural block diagram of the components of a holographic memory system illustrating the optical paths used during a write or record operation, and which may include one or more embodiments of the present invention.
Figure 2B:
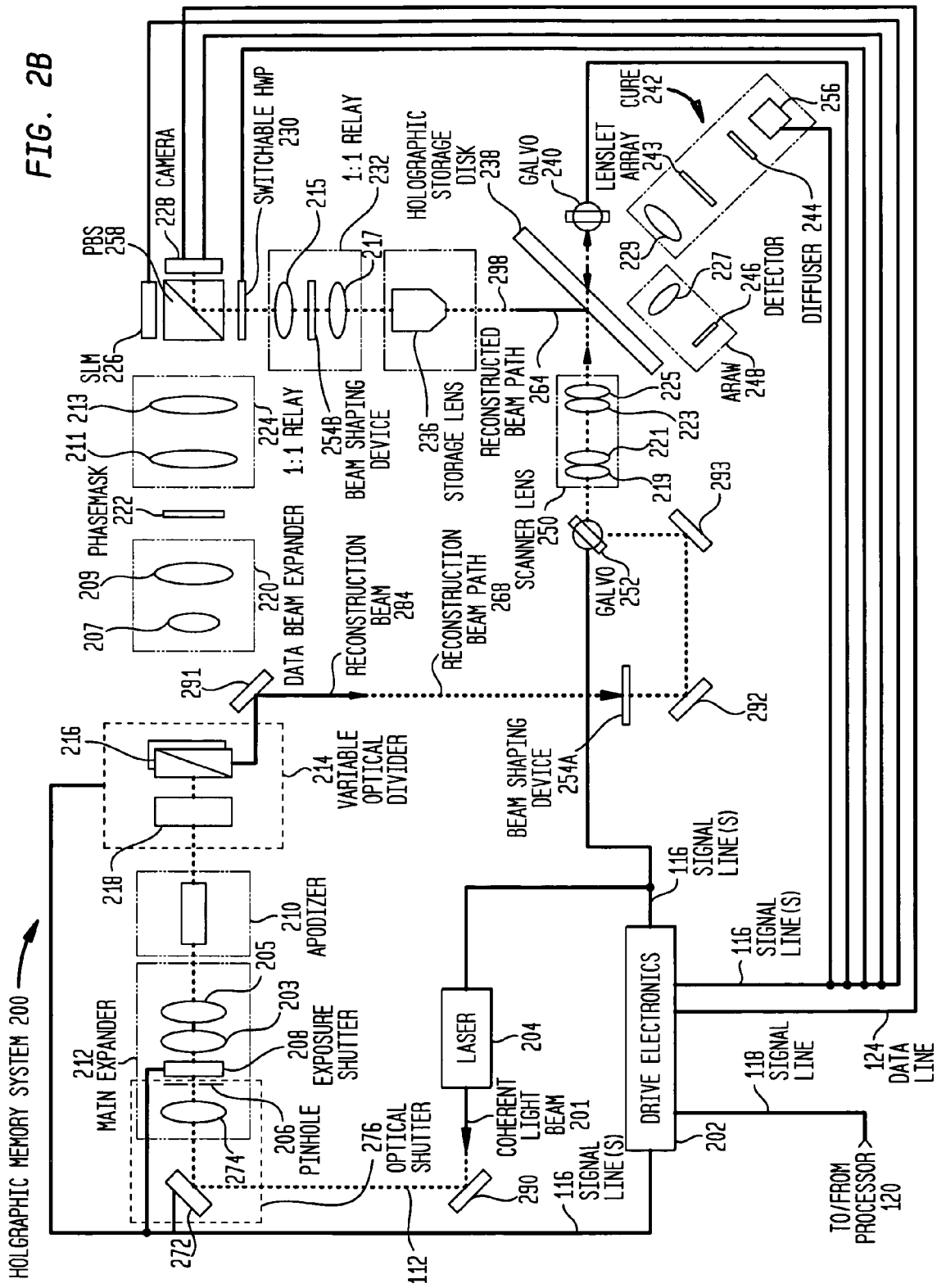
FIG. 2B is an architectural block diagram of the components of a holographic memory system illustrating the optical paths used during a read or reconstruct operation, and which may include one or more embodiments of the present invention.

The components of an exemplary embodiment of HMS 100 are illustrated in more detail in FIGS. 2A and 2B, and is referred to generally as holographic memory system 200 ("HMS 200" herein). FIGS. 2A and 2B are similar schematic block diagrams of the components of one embodiment of HMS 200 illustrating the optical paths utilized during write and read operations, respectively.

Referring first to FIG. 2A, HMS 200 is shown in a record or write operation or mode (herein "write mode configuration"). Coherent light source 102 (see FIG. 1) is shown in FIG. 2A in the form of laser 204. Laser 204 receives via signal line 116 control signals from an embodiment of drive electronics 108 (FIG. 1), referred to in FIG. 2A as drive electronics 202. In the illustrated write mode configuration, such a control signal may cause laser 204 to generate a coherent light beam 201 which is directed along light path 112 (see FIG. 1).

Coherent light beam 201 from laser 204 is reflected by mirror 290 and may be directed through optical shutter 276. Optical shutter 276 comprises beam deviation assembly 272, focusing lens 274 and pinhole 206 that collectively shutter coherent light beam 201 from entering the remainder of optical steering subsystem 104. The details of the exemplary optical shutter 276 are described in more detail in the above-related U.S. application Ser. No. 11/440,448, entitled "Improved Operational Mode Performance of a Holographic Data Storage (HDS) Drive System," filed May 25, 2006. Further, it should be noted that this is but one exemplary optical shutter and other embodiments may use a different type of optical shutter or an optical shutter need not be used.

Coherent light beam 201 passing through optical shutter 276 enters main expander assembly 212. Main expander assembly 212 includes lenses 203 and 205 to expand coherent light beam 201 to a fixed diameter and to spatially filter coherent light beam 201. Main expander assembly 212 also includes lens 274 and pinhole 206 to spatially filter the light beam. An exposure shutter 208 within main expander assembly 212 is an eletromechanical device which may be used to control recording exposure times.

Upon exiting main expander assembly 212, the coherent light beam 201 may be directed through apodizer 210. Light emitted from a laser such as laser 204 may have a spatially varying distribution of light. Apodizer 210 converts this spatially varying intensity beam 201 from laser 204 into a more uniform beam with controlled edge profiles.

After passing through apodizer 210, coherent light beam 201 may enter variable optical divider 214. Variable optical divider 214 uses a dynamically-controlled polarization device 218 and at least one polarizing beam splitter (PBS) 216 to redirect coherent light beam 201 into one or more discrete light beams transmitted along two light paths 114 (see FIG. 1), referred to in FIG. 2A as light path 260 and light path 262. Variable optical divider 214 dynamically allocates power of coherent light beam 201 among these discrete light beams, indicated as 280 and 282. In the write operational mode shown in FIG. 2A, the discrete light beam directed along light path 260 is referred to as reference light beam 280 (also referred to herein as reference beam 280), while the discrete light beam directed along light path 262 is referred to as data light beam 282 (also referred to herein as data beam 282).

Upon exiting variable optical divider 214, reference beam 280 is reflected by mirror 291 and directed through a beam shaping device 254A. After passing through beam shaping device 254A, reference beam 280 is reflected by mirrors 292 and 293 towards galvo mirror 252. Galvo mirror 252 reflects reference beam 280 into scanner lens assembly 250. Scanner lens assembly 250 has lenses 219, 221, 223 and 225 to pivotally direct reference beam 280 at holographic storage medium 106, shown in FIG. 2A as holographic storage disk 238.

Referring again to variable optical divider 214, data light beam 282 exits variable optical divider 214 and passes through data beam expander lens assembly 220. Data beam expander 220 implements lenses 207 and 209 to magnify data beam 282 to a diameter suitable for illuminating Spatial Light Modulator (SLM) 226, located further along data beam path 262. Data beam 282 then passes through phasemask 222 to improve the uniformity of the Fourier transform intensity distribution. Data beam 282 illumination of phasemask 222 is then imaged onto SLM 226 via 1:1 relay 224 having lenses 211 and 213. PBS 258 directs data beam 282 onto SLM 226.

SLM 226 modulates data beam 282 to encode information into data beam 282. SLM 226 receives the encoding information from drive electronics 202 via a signal line 116. Modulated data beam 282 is reflected from SLM 226 and passes through PBS 258 to a switchable half-wave plate 230. Switchable half-wave plate 230 may be used to optionally rotate the polarization of data beam 282 by 90 degrees. A 1:1 relay 232 containing a beam-shaping device 254B and lenses 215 and 217 directs data beam 282 to storage lens 236 which produces a filtered Fourier transform of the SLM data inside holographic storage disk 238. At a particular point within holographic storage disk 238, reference light beam 280 and data light beam 282 create an interference pattern to record a hologram in holographic storage disk 238.

Referring next to the read mode configuration illustrated in FIG. 2B, laser 204 generates coherent light 201 in response to control signals received from drive electronics 202. As noted with regard to FIG. 2A, coherent light beam 201 is reflected by mirror 290 through optical shutter 276 that shutters coherent light beam 201 from entering the remainder of optical steering subsystem 104. Coherent light beam 201 thereafter enters main expander assembly 212 which expands and spatially filters the light beam, as described above with reference to FIG. 2A. Upon exiting main expander assembly 212, coherent light beam 201 is directed through apodizer 210 to convert the spatially varying intensity beam into a more uniform beam.

In the arrangement of FIG. 2B, when coherent light beam 201 enters variable optical divider 214, dynamically-controlled polarization device 218 and PBS 216 collectively redirect the coherent light into one discrete light beam 114, referred to as reconstruction beam 284. Reconstruction beam 284 travels along reconstruction beam path 268, which is the same path 260 traveled by reference beam 280 during the write mode of operation, as described with reference to FIG. 2A.

A desired portion of the power of coherent light beam 201 is allocated to this single discrete reconstruction beam 284 based on the selected polarization implemented in device 218. In certain embodiments, all of the power of coherent light beam 201 is allocated to reconstruction light beam 284 to maximize the speed at which data may be read from holographic storage disk 238.

Upon exiting variable optical divider 214, reconstruction beam 284 is reflected from mirror 291. Mirror 291 directs reconstruction beam 284 through beam shaping device 254A. After passing through beam shaping device 254A, reconstruction beam 284 is directed to scanner lens assembly 250 by mirrors 292 and 293, and galvo 252. Scanner lens assembly 250 pivots reconstruction beam 284 at a desired angle toward holographic storage disk 238.

During the read mode, reconstruction beam 284 may pass through holographic storage disk 238 and may be retro-reflected back through the medium by a second conjugator galvo 240. As shown in FIG. 2B, the data reconstructed on this second pass through storage disk 238 is directed along reconstructed data beam path 298 as reconstructed data beam 264.

Reconstructed data beam 264 passes through storage lens 236 and 1:1 relay 232 to switchable half wave plate 230. Switchable half wave plate 230 is controlled by drive electronics 202 so as to have a negligible polarization effect. Reconstructed data beam 264 then travels through switchable half wave plate 230 to PBS 258, all of which are described above with reference to FIG. 2A. PBS 258 reflects reconstructed data beam 264 to an embodiment of sensor 110 (see FIG. 1) in the form of a camera 228. The light detected by camera 228 is converted to a signal and transmitted to drive electronics 202 via signal line 124 (see FIG. 1). Processor 120 then receives the requested data and/or related information from drive electronics 202 via signal line 118 (see FIG. 1).

HMS 200 may further comprise an illuminative media cure subsystem 242. Media cure subsystem 242 is configured to provide a uniform curing beam with reduced coherence to storage disk 238 to pre-cure and/or post-cure a region of storage disk 238 following the writing process. Media cure subsystem 242 may comprise a laser 256 sequentially aligned with a diffuser 244, a lenslet array 243 and a lens 229. The light from laser 256 is processed by diffuser 244, lenslet array 243, and lens 229 to provide a uniform curing beam with reduced coherence prior to reaching storage disk 238.

HMS 200 may additionally comprise an associative read after write (ARAW) subsystem 248. ARAW subsystem 248 is configured to partially verify a hologram soon after the hologram is written to holographic storage disk 238. ARAW subsystem may comprise a lens 227 and a detector 246. Holographic system 100 uses ARAW subsystem 248 by illuminating a written hologram with an all-white data page. When a hologram is illuminated by this all-white data page, ARAW subsystem 248 detects the reconstructed reference beam resulting from this all-white illumination. Specifically, detector 246 examines the reconstructed reference beam to verify that the hologram has been recorded correctly.

Description of Mounting Structure for Holographic Drive Head Assembly

Embodiments of the present invention relate to a mounting structure for the holographic drive head assembly. The mechanical stability of a holographic drive head assembly may be greatly improved through the use of a unitary (e.g., monolithic) mounting structure having sufficient rigidity to minimize, reduce, diminish, eliminate, etc., some, most or all motion effects (e.g., those caused by vibrations, shocks, impacts, etc.) which might affect optical alignment of holographic drive head components and/or subassemblies mounted thereon. Mounting structures made from or comprising a plurality of sections, portions, etc., may be more likely to have residual manufacturing induced stresses which may tend to warp and twist the structure over time and/or due to temperature variations as those stresses relax. Mounting of some, most or all of the optical, optomechanical, optoelectrical, and eletromechanical components, and/or subassemblies of such components, of the holographic drive head assembly on a unitary (e.g., monolithic) mounting structure may be used improve optical alignment, thermal stability, mechanical stiffness, etc., of the holographic drive head assembly. Such components and/or subassemblies may include, for example, laser 204, data beam expander subassembly 220, relay subassemblies 224 and 232, scanner lens subassembly 250, storage lens subassembly 236, SLM/PBS subassembly 226/258, etc. Additionally, a unitary mounting structure may be made, formed, manufactured, etc., with better positional tolerances of passive alignment features than might be achieved with mounting structures made from or comprising a plurality of sections, portions, etc., of equal expense.

This mounting structure may be made, formed, manufactured, etc., from a relatively uncomplex structure (e.g., a large plate), or may be made or formed as a more complex (e.g., three dimensional) structure. The mounting structure may be made, formed, manufactured, etc., through machining, casting, molding (e.g., injection molding), etc., or any combination thereof. The mounting structure may be formed, made, manufactured, etc., in such a way and/or from such a material so as to have very stable mechanical properties having, for example, minimal twist of the structure over time and/or as a result of temperature variations. The mounting structure may be formed, made, manufactured, etc., from any material which provides sufficient rigidity to minimize, reduce, diminish, eliminate, etc., some, most or all motion effects (e.g., vibrations, shocks, impacts, etc.) affecting optical alignment of holographic drive head assembly components and/or subassemblies. For example, the mounting structure may comprise reinforced plastics, carbon composites, light weight metals such as aluminum, magnesium, etc.

The stability of the mounting structure may be further improved, and the mass further reduced, by selective removal or omission of non-critical volumes of material therefrom. Non-critical volumes of material may be removed or omitted from the mounting structure during fabrication or design (e.g., in the machining casting, molding, etc.) to provide, for example, pockets, cavities, holes, spaces, voids, etc., for the purpose of weight reduction, as well as to impart improved mechanical stiffness, thermal stability, etc. For example, in the case of a cast or molded structure, voids, pockets, spaces, holes, cavities, etc., may be designed into the mounting structure to reduce the total mass (and cost) of the holographic drive head assembly, while simultaneously improving stiffness of the mounting structure to minimize motion effects (e.g., vibrations). Removal or omission of material from the mounting structure during fabrication or design may also be used to minimize one or more external dimensions of the structure, as well as to provide passive alignment means for mounted components and/or subassemblies.

The mounting structure may also be provided with preselected locations for mounting components and/or subassemblies of the holographic drive head that require or may require optical alignment. By providing preselected locations on the mounting structure for mounting these components and/or subassemblies, holographic drive head assemblies may be formed, made, manufactured, etc., to have consistent, uniform, etc., optical alignment of the various components and/or subassemblies with minimal or no need for extensive alignment of these components and/or subassemblies after mounting. Providing preselected mounting locations may also provide improved mechanical and thermal stability as well as more accurate placement tolerances for the mounted components and/or subassemblies.

One or more passive alignment members may also be provided in conjunction with mounting some, most or all of these components and/or subassemblies at these preselected locations. For example, the ability to interchange holographic storage media between different holographic data storage devices (e.g., to read data from a holographic medium or media in one device which was recorded in a different device) may require precise alignment of the reference beam optical path (e.g., path 260 of FIG. 2A) with respect to the data beam optical path (e.g., path 262 of FIG. 2A) and the holographic medium (e.g., storage disk 238 of FIG. 2A). Previously, this alignment procedure could be extremely time consuming and necessitate complicated hardware to attain the level of adjustment and precision needed. Minimizing or eliminating the need to actively align the reference beam path to the data beam path may thus be desirable from a manufacturing and performance standpoint. By using a unitized mounting structure in combination with preselected mounting locations and passive alignment members, more precise, consistent, uniform, etc., manufacturing and assembly techniques for holographic head drive assemblies may be carried out which result in the desired relationship and optical alignment between the reference beam path (or portion thereof) and the data beam path (or part thereof) being achieved with minimal or no active adjustment being required.

Figure 3:
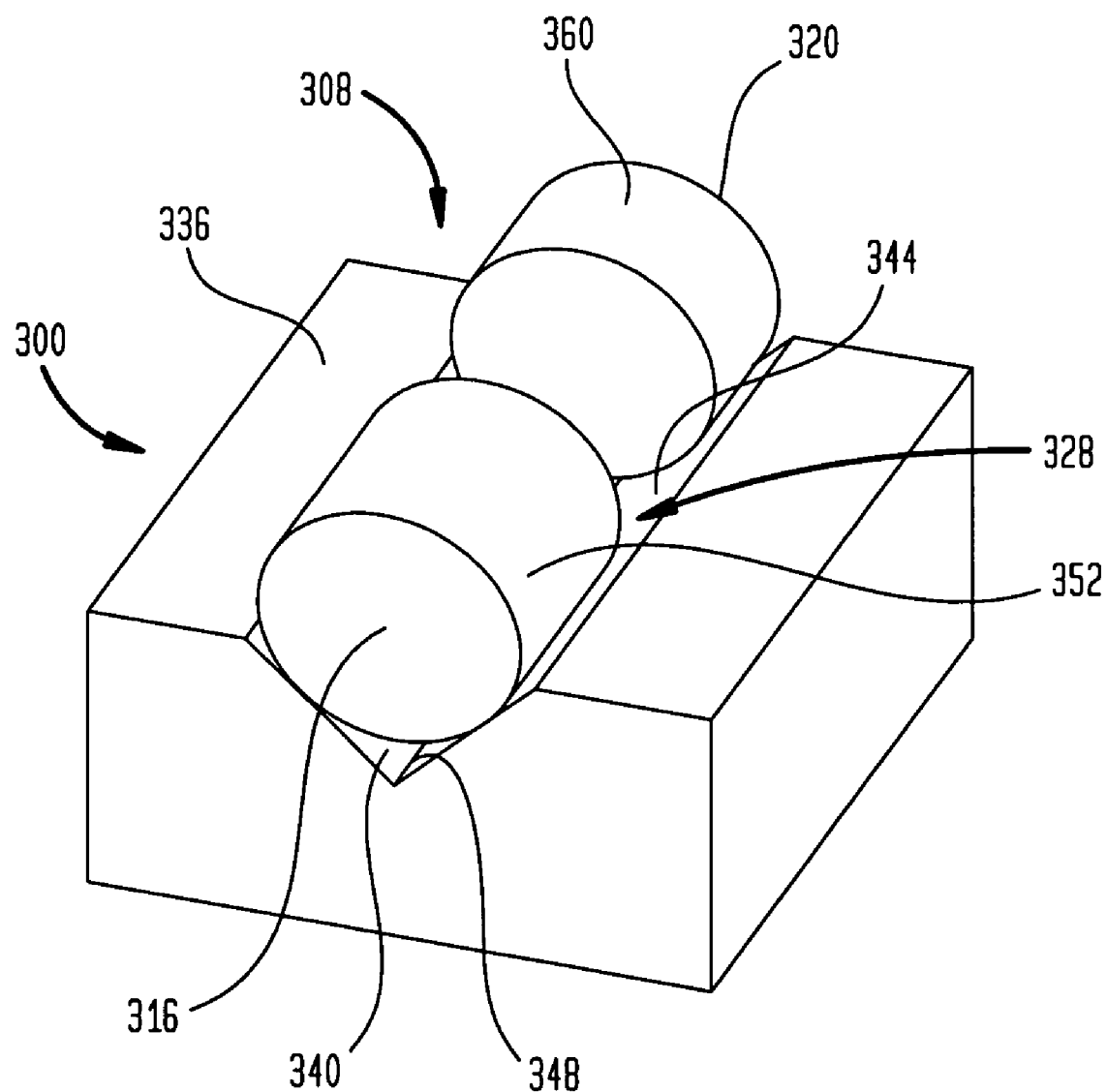
FIG. 3 is a top perspective view of a mounting structure showing an embodiment of a means for passive alignment of an optical component or subassembly according to the present invention.
Figure 4:
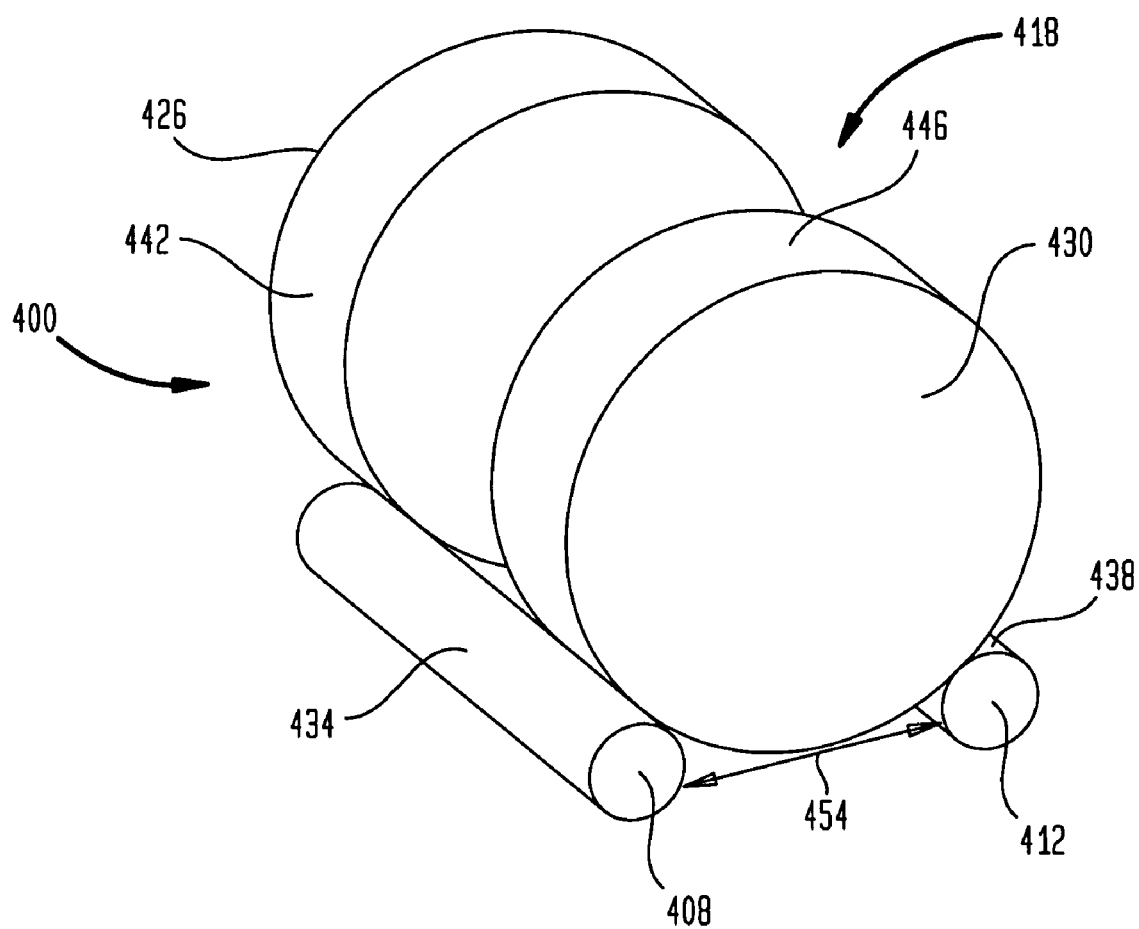
FIG. 4 is a top perspective view of another embodiment of the present invention for passive alignment of an optical component or subassembly.
Figure 5:
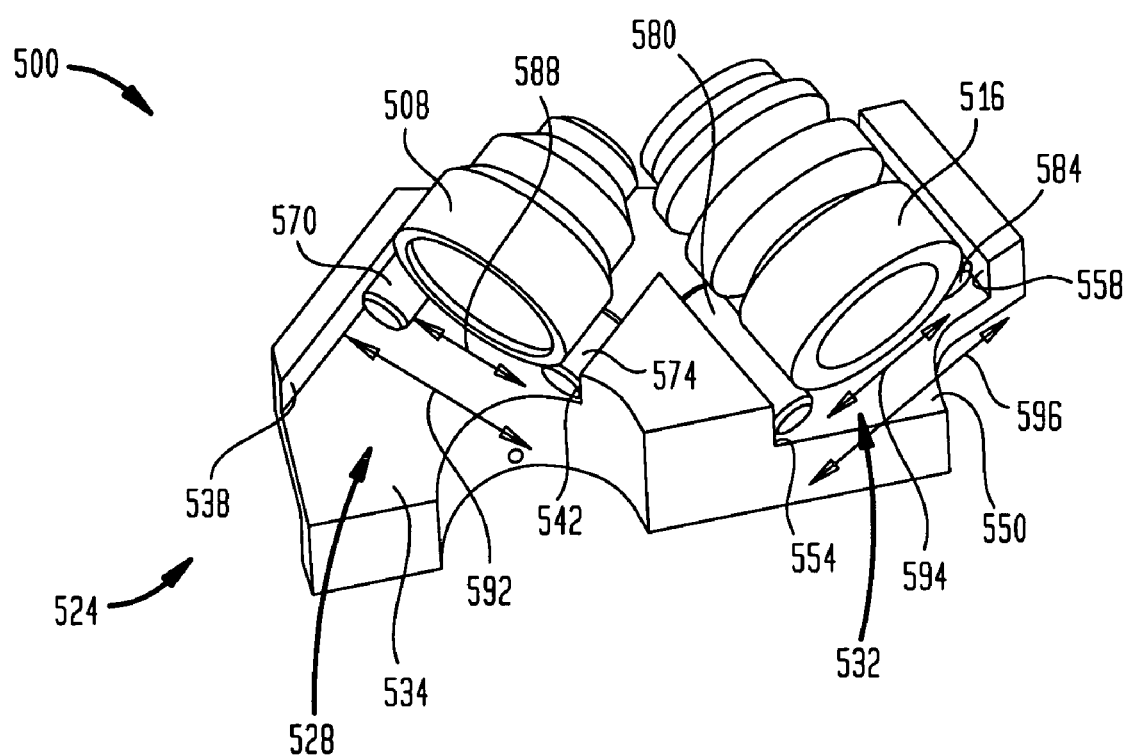
FIG. 5 is a top perspective view of an embodiment of a pair of subassemblies which are passively aligned according to the present invention.

These passive alignment members may be separate from the mounting structure, may be integral therewith, or may be a combination thereof. For example, the mounting structure may be provided with built-in passive alignment members (e.g., passive alignment rails, guides, grooves, walls, surfaces, datums, features, etc., or combinations thereof) to which the components and/or subassemblies of the holographic drive head assembly that require or may require optical alignment are positioned to, mounted on, attached to, etc. Some illustrative embodiments of passive alignment members that may be used with, formed in, etc., the mounting structure to optically align the components and/or subassemblies of the holographic drive head assembly are shown in FIGS. 3-5. FIG. 3 illustrates one embodiment of a passive alignment member that may be separate from or be formed in (i.e., is integral with) the mounting structure, which is indicated generally as 300. As shown in FIG. 3, passive alignment member 300 is used to mount and align a subassembly of components, for example, a lens subassembly 308 comprising a pair of axially spaced apart optical lenses, indicated as 316 and 320. Although not shown, lens subassembly 308 may include a housing (e.g., a generally cylindrically-shaped housing) for integrating lens 316 and 320 into subassembly 308. A shown in FIG. 3, a generally V-shaped groove 328 may be formed in the upper surface 336 of member 300. Groove 328 comprises a pair of datum or reference surfaces 340 and 344 joined or intersecting at an edge 348. Surfaces 340 and 344 mount lens subassembly 308 by engaging the outer circumferential surface 352 of lens 316 and the outer circumferential surface 360 of lens 320.

The angle formed by the intersection of surfaces 340 and 344 at edge 348, as well as the diameter of lenses 316 and 320, determine at which point surfaces 352 and 360 engage surfaces 340 and 344. In fact, altering or changing the angle between surfaces 340 and 344 may be used to vertically adjust how far down or up lenses 316 and 320 are seated within groove 328. Similarly, altering or changing the diameter of lenses 316 and 320 may also be used to adjust how far down or up lenses 316 and 320 are seated within groove 328. Because the angle between surfaces 340 and 344 is often constant or fixed, and because the diameters of 316 and 320 are also often constant or fixed, lens subassembly 308 may be mounted at a constant or fixed vertical position or depth within groove 328. This results in a known positioning of lens subassembly 308 which is independent of the axial position of subassembly 308 along the length of the groove 328 and which may be used to ensure optical alignment with respect to other components and/or subassemblies of the holographic drive head assembly. For example, the axial distance between lenses 316 and 320 may be adjusted without also causing a lateral shift between the lenses 316 and 320. Such adjustments may be a common assembly step during the alignment of a holographic drive head and/or one or more of the respective components and/or subassemblies.

FIG. 4 illustrates another embodiment of a passive alignment member indicated generally as 400 which comprises a pair of generally cylindrical laterally spaced apart guides or rails, indicated as 408 and 412. Rails 408 and 412 are used to mount and align a subassembly of components, for example, a lens subassembly 418 (e.g., similar to subassembly 308 of FIG. 3) comprising a pair of axially spaced apart optical lenses, indicated as 426 and 430. As shown in FIG. 4, the outer circumferential surfaces 434 and 438 of, respectively, rails 408 and 412, mount lens assembly 418 by engaging the outer circumferential surface 442 of lens 426 and the outer circumferential surface 446 of lens 430.

The respective diameters of rails 408 and 412, in combination with the distance between surfaces 434 and 438, as indicated by double headed arrow 454, determine at which point surfaces 442 and 446 of lenses 426 and 430 engage rails 408 and 412. If the diameters of rails 408 and 412 are kept constant or fixed, the positioning of lens assembly 418 may be adjusted vertically up or down. In fact, if distance 454 is kept constant or fixed for rails 408 and 412, lens subassembly 418 may be mounted on rails 408 and 412 at a constant or fixed vertical position. Like passive alignment member 300 of FIG. 3, providing a constant or fixed distance 454 results in a known positioning of lens assembly 418 that may be used to ensure optical alignment with respect to other components and/or subassemblies of the holographic drive head assembly.

FIG. 5 illustrates an embodiment comprising a pair of passive alignment members which is used in combination with a pair of component or component subassemblies, with the combination being indicated generally as 500. As shown in FIG. 5, combination 500 comprises a pair of component or component subassemblies which may be in the form of a reference beam lens component or component subassembly (e.g., scanner lens subassembly 250 of FIG. 2A), indicated generally as 508, and a data beam lens component or subassembly (e.g., storage lens 236 of FIG. 2A), indicated generally as 516. Lens component/assemblies 508 and 516 are mounted on or by a mounting member, indicated generally as 524. Mounting member 524 may have formed therein a pair of passive alignment recesses 528 and 532. Recess 528 has a bottom surface 534, and a pair of spaced apart generally parallel walls 538 and 542 extending upwardly from bottom surface 534. Recess 532 also has a bottom surface 550, and a pair of spaced apart generally parallel walls 554 and 558 extending upwardly from bottom surface 550.

As shown in FIG. 5, recess 528 may be provided with a pair of generally cylindrical spaced apart guides or rails 570 and 574. Rail 570 engages recess wall 538, while rail 574 engages recess wall 542. Lens component/subassembly 508 is mounted on rails 570 and 574. Recess 532 may also be provided with a pair of generally cylindrical spaced apart guides or rails 580 and 584. Rail 580 engages recess wall 554, while rail 584 engages recess wall 558.

Lens component/subassembly 508 may be mounted on rails 570 and 574, while lens subassembly 516 may be mounted on rails 580 and 584. Assuming that the diameter of lens component/subassembly 508, as well as the diameter of rails 570 and 574, is kept constant or fixed, the point at which lens component/subassembly 508 engages rails 570 and 574 is determined by the distance between rails 570 and 574, as indicated by double headed arrow 588, which is affected or controlled by the width of recess 528 (between walls 538 and 542), as indicated by double headed arrow 592. In other words, by changing the width 592 of recess 528, the distance 588 between rails 570 and 574 may also be adjusted or controlled, thereby adjusting the vertical positioning of lens subassembly 508. Alternatively, the vertical positioning of lens component/subassembly 508 may instead be adjusted by the insertion of one or more spacers between either rail 570 and wall 538, or rail 574 and wall 542, thereby decreasing the width 588 without modifying recess 528. Also alternatively, the vertically positioning of lens component/subassembly 508 may be adjusted by altering or changing the diameter of rails 570 and 574 (thus changing distance 588), thus keeping width 592 constant or fixed.

Similarly, assuming that the diameter of lens component/subassembly 516, as well as the diameter of rails 580 and 584, is kept constant or fixed, the point at which lens subassembly engages rails 580 and 584 is determined by the distance between rails 580 and 584, as indicated by double headed arrow 594, which is affected by the width of recess 532 (between walls 554 and 558), as indicated by double headed arrow 596. In other words, by changing the width 596, the distance 594 between rails 580 and 584 which may be adjusted or controlled, thereby adjusting the vertical positioning of lens component/subassembly 508. Alternatively, the vertical positioning of lens component/subassembly 516 may instead be adjusted by the insertion of one or more spacers between either rail 580 and wall 554, or rail 584 and wall 558, thereby decreasing the width 594 without modifying recess 532. Also alternatively, the vertical positioning of lens component/subassembly 516 may be adjusted by altering or changing the diameter of rails 580 and 584 (thus changing distance 594), while keeping width 596 constant or fixed.

In fact, the optical alignment between lens component/assembly 508 and 516 may be adjusted or controlled by controlling the distance 594 between rails 580 and 584, as well as controlling the distance 596 between rails 580 and 584. In an embodiment of 500, the distances 588 and 594 may be kept constant or fixed to ensure optical alignment between lens component/subassembly 508 and 516, as well as with respect to other components and/or subassemblies of the holographic drive head assembly.

Passive alignment members, for example, such as those illustrated in FIGS. 3-5 may provide a precise, consistent, uniform, etc., means for constraining and optically aligning components and/or subassemblies of the holographic drive head assembly, for example, those components and/or subassemblies in reference beam path 260 and data beam path 262 (see FIG. 2A). These passive alignment members may permit the mounting of, for example, optical components and/or assemblies, within precise optical tolerances (e.g., tolerances along the axis of the optical path from one lens to another lens on the order of about 0.0005") that may be required in holographic data storage device, such as HMS 200. As already alluded to with respect to the embodiment of FIG. 3, optical alignment of the various components of the holographic drive head assembly may be further improved through aggregation or combination of these components into subassemblies where, for example, the optical inputs and outputs of these components are collimated light. Such unitization of the components into subassemblies may also separate or isolate lateral and angular tolerance requirements of the optical components (e.g., lenses, etc.) from the mounting structure. Such subassemblies may also simplify the axial alignment between two components by enabling "Z" translation independent of radial position requirements or error issues (i.e., the axial spacing between the various components and/or subassemblies).

The manufacture and optical alignment of the components and/or subassemblies of the holographic drive head assembly mounted on the mounting structure may be further simplified by providing that the preselected mounting locations are oriented such that one or more (e.g., some, most or all) pairs of adjacent or sequential components or subassemblies are not coaxial, i.e., are not linearly aligned. To utilize more efficient manufacturing and assembly principles, each subassembly of components may be independently assembled and aligned and then mounted on the mounting structure with other subassemblies and/or components of the holographic drive head assembly. To optically link these separate subassemblies on the mounting structure, optical path bending or altering elements (e.g., reflectors, mirrors, prisms, mirrored prisms) may be positioned or placed between each pair of adjacent or sequential subassemblies and/or components that are not coaxial so that input and output optical radial alignment tolerances may be decoupled from the positioning and mounting of the subassemblies and/or components on the mounting structure. In addition, if the subassembly and/or component uses a passive alignment feature, such as V-groove 328 shown in FIG. 3, then any necessary focus adjustment, i.e., an adjustment in the axial spacing between the subassemblies and/or components, may be performed independent of the radial optical alignment tolerances. This decoupling may also enable a more rigid mounting of these subassemblies and/or components, and thus potentially greater resistance or immunity against motion effects (e.g., vibrations, shocks, impacts, etc.). This decoupling may also enable the use of "pick and place" techniques to position and mount the optical path bending or altering elements. Paired optical path bending or altering elements may also be used to align separate optical components and/or assemblies to create planar or compact geometries. In some embodiments, the use of optical path bending or altering elements, in combination with preselected mounting locations and passive alignment members, may enable multiple optical components and/or assemblies to be mounted within tight optical axis tolerances because these components and/or assemblies may be placed or positioned on surfaces that are nearly or exactly coplanar.

FIGS. 6-12 illustrate an embodiment of a mounting structure with preselected locations for mounting holographic drive head components and/or subassemblies, along with passive alignment members integral with, as well as separate from the mounting structure. Although not shown in FIGS. 6-12, the mounting structure, indicated generally as 600, may use optical path bending or altering elements to optically link separate subassemblies and/or components of the holographic drive head assembly (especially where adjacent pairs of subassemblies and/or components are not coaxial) into a fairly compact and optically aligned system that may require minimal or no active alignment of the respective optical paths, e.g., reference beam path 260 and data beam path 262 of FIG. 2A.

Figure 6:
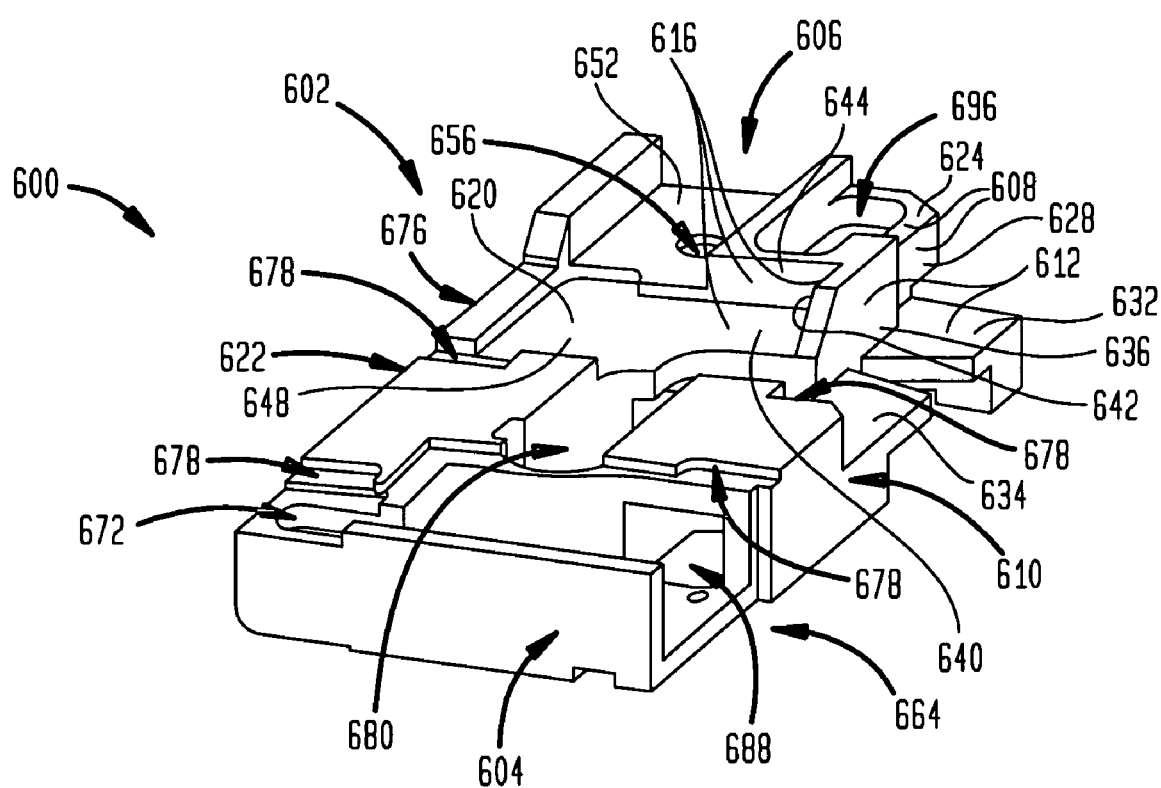
FIG. 6 is a top perspective view of an embodiment of a mounting structure with preselected locations and passive alignment members for mounting holographic drive head components and/or subassemblies.

Referring to FIG. 6, mounting structure 600 has an upper or top side, indicated generally as 602, and a forward half or section, indicated generally as 604, and a rearward half or section, indicated generally as 606. Top side 602 may be provided with a plurality of preselected mounting locations. For example, as shown in FIG. 6, top side 602 may be provided with a preselected SLM/PBS subassembly mounting location, indicated generally as 608, that is positioned in rearward section 606 closest to lateral side 610, a preselected relay lens subassembly mounting location, indicated generally as 612, positioned near or adjacent to SLM/PBS subassembly mounting location 608 and along lateral side 610 in rearward section 606, a preselected mounting block mounting location, indicated generally as 616, positioned in rearward section 606 near or adjacent relay lens subassembly mounting location 612, and a preselected scanner lens subassembly mounting location, indicated generally as 620, positioned in rearward section 606 proximate lateral side 622 and near or adjacent mounting block location 616.

As shown in FIG. 6, SLM/PBS subassembly mounting location 608 comprises a horizontal mounting or referencing surface 624 and a vertical mounting or referencing surface 628 which is oriented generally orthogonal to surface 624. Relay lens subassembly mounting location 612 comprises a first horizontal mounting or referencing surface 632, a second horizontal mounting or referencing surface 634 which is oriented generally coplanar with surface 632, and a vertical mounting or referencing surface 636 which is oriented generally orthogonal to surfaces 632 and 634. Mounting block location 616 comprises a horizontal mounting or referencing surface 640, a first vertical mounting or referencing surface 642 which is oriented generally orthogonal to surface 640, and a second vertical mounting or referencing surface 644 which is oriented generally orthogonal to both of surfaces 640 and 642. Scanner lens assembly mounting location 620 is shown in FIG. 6 as comprising horizontal mounting or referencing surface 648 which is generally coplanar with surface 640.

As further shown in FIG. 6, top side 602 may be provided with a generally U-shaped recess 652 in rearward section 606 and proximate lateral side 622 which may be used to mount, for example, galvo 252 (see FIG. 2A). Recess 652 may have formed therein a hole 656 through which, for example, reference beam path 260 may extend from mirror 293 to galvo 252 (see FIG. 2A). Forward section 604 may be provided with a compartment or bay 664 for mounting, for example, laser 204 (see FIG. 2A), which opens outwardly through side 610. At one end of bay 664 is a U-shaped recess 672 provided, for example, for mirror 290 (see FIG. 2A). The arrow 676 indicates the holographic medium loader area where the holographic medium is laterally transported to and from the holographic drive head assembly by a loader (not shown). Four mounting locations or pads for the loader (not shown) are indicated by arrows 678. An oval-shaped aperture 680 is formed in forward section 604 of structure 600 to receive the drive spindle of the loader (not shown). Arrows 688 and 696 indicate weight reduction and/or stability pockets that may be formed in structure 600.

Figure 7:
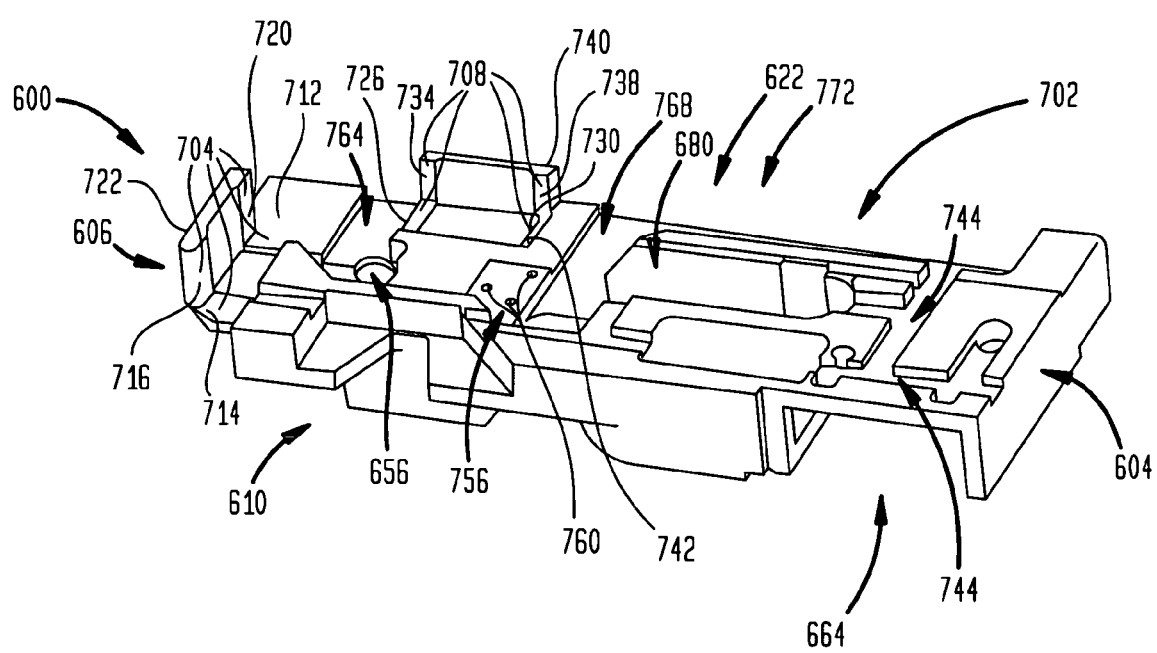
FIG. 7 is a bottom perspective view of the embodiment of the mounting structure shown in FIG. 6.

Referring to FIG. 7, structure 600 has a bottom or underside, indicated generally as 702. Underside 702 is shown in FIG. 7 as also being provided with a plurality of preselected mounting locations. For example, underside 702 may be provided with a preselected relay lens subassembly mounting location, indicated generally as 704, which is positioned at the end of rearward section 606, and a preselected data expander subassembly mounting location, indicated generally as 708, which is positioned in rearward section 606 and proximate side 610. Relay lens subassembly mounting location 704 comprises a first horizontal mounting or referencing surface 712, a second horizontal mounting or referencing surface 714 which is oriented generally coplanar with surface 712, a first vertical mounting or referencing surface 716 which is oriented generally orthogonal to surfaces 712 and 714, and a second vertical mounting or referencing surface 720 which is oriented generally coplanar with surface 716, and generally orthogonal to surfaces 712 and 714. Vertical surfaces 716 and 720 are laterally spaced apart and are positioned on downwardly extending mounting wall 722. Data expander subassembly mounting location 708 comprises a first horizontal mounting or referencing surface 726, a second horizontal mounting or referencing surface 730 which is oriented generally coplanar with surface 726, a first vertical mounting or referencing surface 734 which is oriented generally orthogonal to surfaces 726 and 730, a second vertical mounting or referencing surface 738 which is laterally spaced apart from but which is oriented generally coplanar with surface 734 and which is oriented generally orthogonal to surfaces 726 and 730, and a third vertical mounting or referencing surface 742 which is oriented generally orthogonal to surfaces 726, 730, 734 and 738. Vertical surfaces 734 and 738 are laterally spaced apart and are positioned on downwardly extending mounting wall 740 proximate side 622.

As further shown in FIG. 7, underside 702 may be provided with cable recesses or slots, some of which are generally indicated as 744. Arrow 756 indicates a mounting area for mounting a component, for example, a prism (not shown). Mounting area 756 may include a triangular array of three protruding mounting bosses, indicated as 760, on which the component may be mounted. Also shown in FIG. 7 is a mounting area, indicated as 764, in the form of a slot positioned between surfaces 712 and 726 for mounting or locating, for example, phasemask 222 (see FIG. 2A), and a mounting area or surface, indicated as 768, for mounting or locating, for example, variable optical divider 214 (see FIG. 2A). Also shown in FIG. 7 is a compartment or bay 772 along lateral side 622 in which, for example, main expander assembly 212 and apodizer 210 (see FIG. 2A) may be mounted or located.

Figure 8:
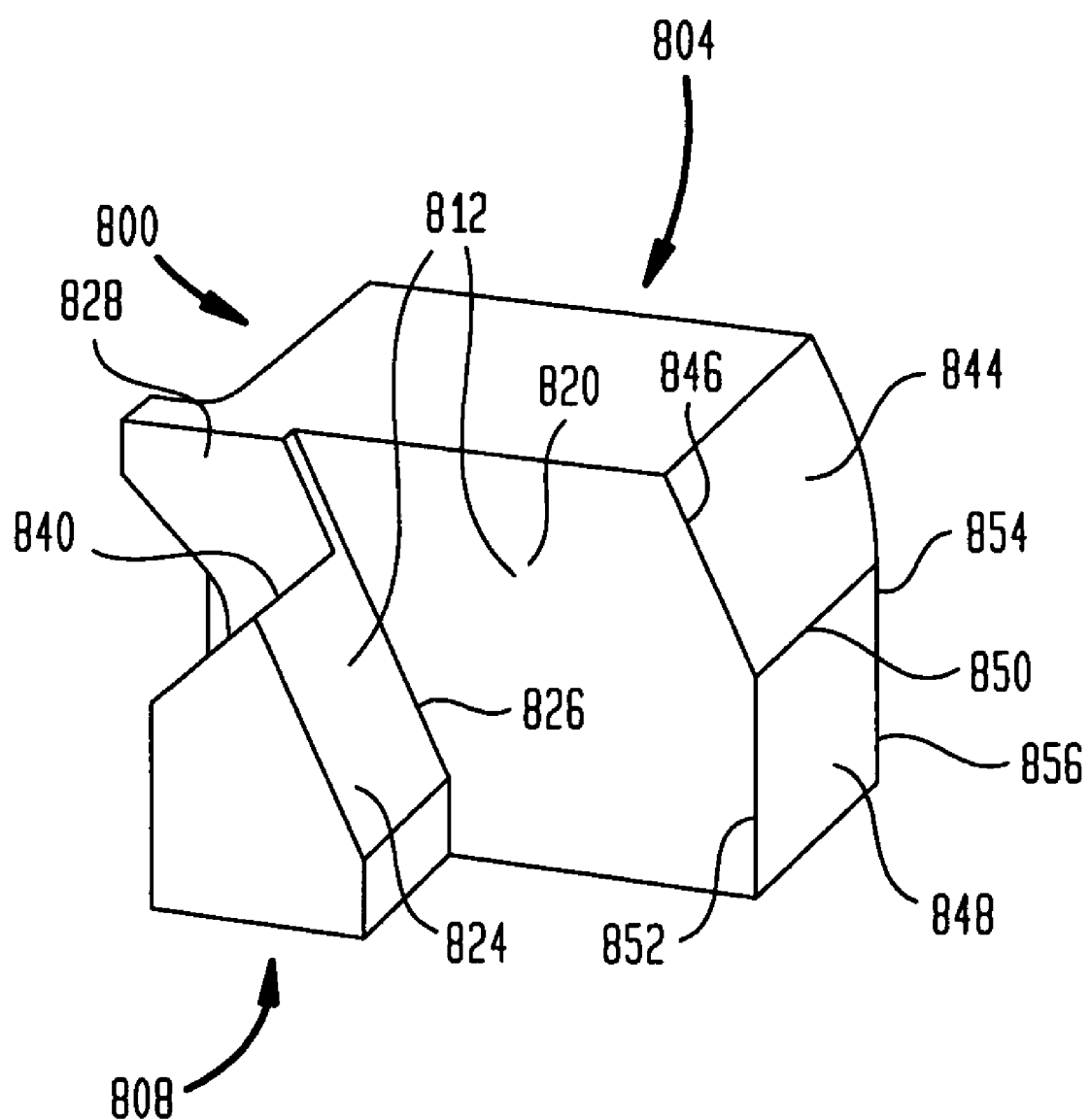
FIG. 8 is a top perspective view an embodiment of a mounting block which may be used with the mounting structure of FIG. 6 showing the mounting or referencing surfaces for a storage lens subassembly.
Figure 9:
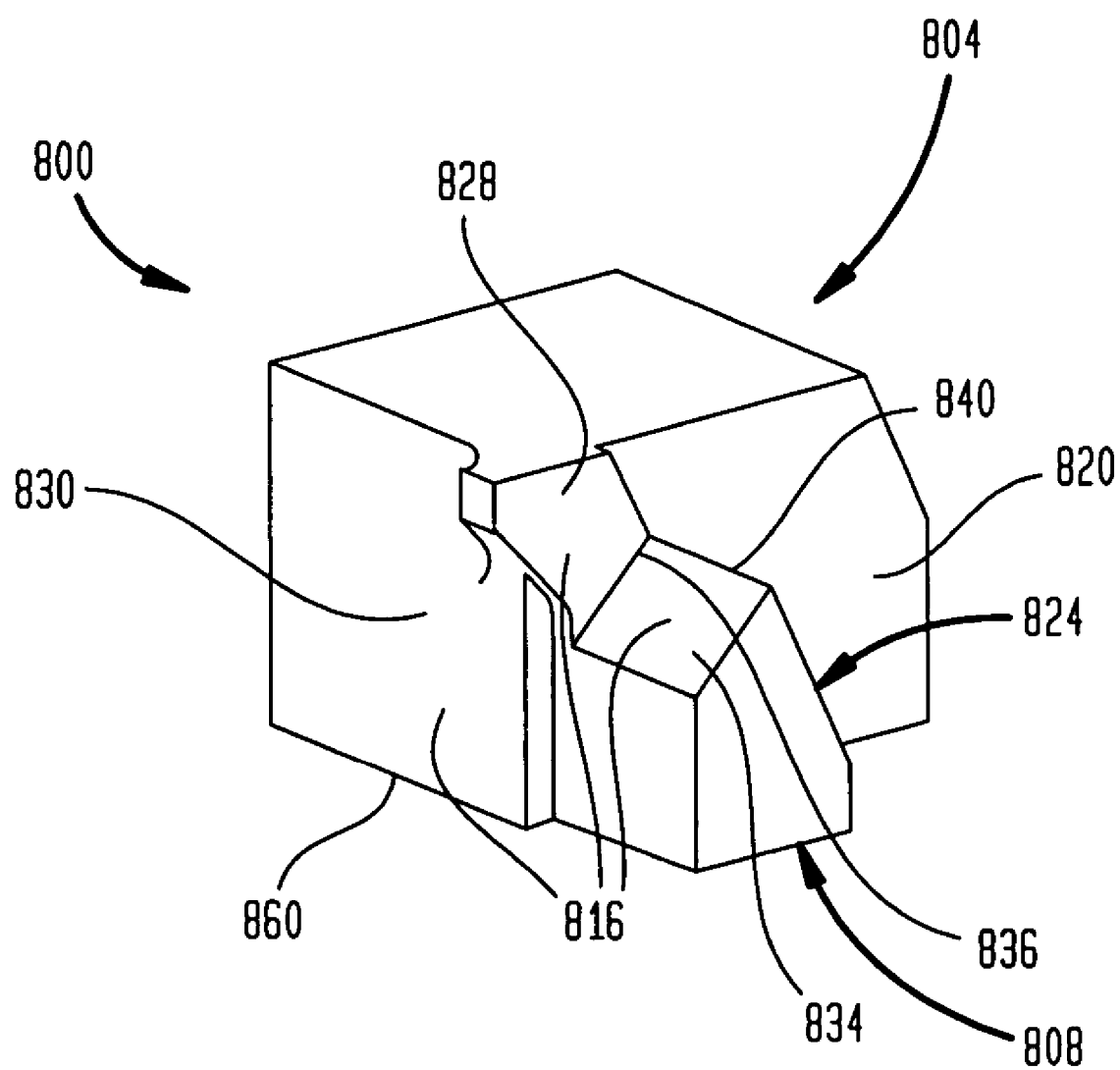
FIG. 9 is a different perspective view of the mounting block of FIG. 8 showing the mounting or referencing surfaces for a scanner lens subassembly.

FIGS. 8-9 illustrate an embodiment of a mounting block, indicated generally as 800, that may be used with structure 600 as a passive alignment member. Mounting block 800 comprises a larger mounting section, indicated generally as 804, and an adjacent or adjoining smaller mounting section, indicated generally as 808. Larger mounting section 804 and smaller mounting section 808 together have or define a preselected storage lens subassembly mounting location, indicated generally as 812, and a preselected scanner lens subassembly mounting location, indicated generally as 816. Storage lens subassembly mounting location 812 comprises a vertical mounting or referencing surface 820 positioned on larger mounting section 804, and an adjacent or adjoining slanted mounting or referencing surface 824 positioned on smaller mounting section 808 which is oriented generally transversely relative to surface 820 and which shares a common slanted edge 826. Scanner lens subassembly mounting location 816 comprises a first vertical mounting or referencing surface 828 positioned on smaller mounting section 808, a second vertical mounting or referencing surface 830 positioned on larger mounting section 804 which is oriented generally orthogonal to surface 828, and a slanted mounting or referencing surface 834 which shares a common slanted edge 836 with adjacent or adjoining surface 828, which is oriented generally transversely relative to surfaces 828 and 830, and which shares a common horizontal edge 840 with slanted surface 824. A clamping surface 844 (e.g., for the storage lens subassembly) may be positioned on larger mounting section 804 and is oriented generally transversely relative to adjacent or adjoining surface 820, shares a common slanted edge 846 with surface 820, and is parallel to surface 824. A first generally rectangular or square-shaped vertical block locating or referencing surface 848 is also positioned on large mounting section 804 below adjacent or adjoining surface 844, and shares common horizontal edge 850 with surface 844 and a common vertical edge 852 with surface 820. Also indicated by FIG. 8 is a second vertical block locating or referencing surface 854 which is also positioned on large mounting section 804, and which is oriented generally orthogonal to adjacent or adjoining surfaces 848 and 830, and shares a common vertical edge 856 with surface 848. Mounting block 800 also has a bottom surface, indicated generally as 860, for mounting block 800 on the top side 602 of structure 600, as described below.

Figure 10:
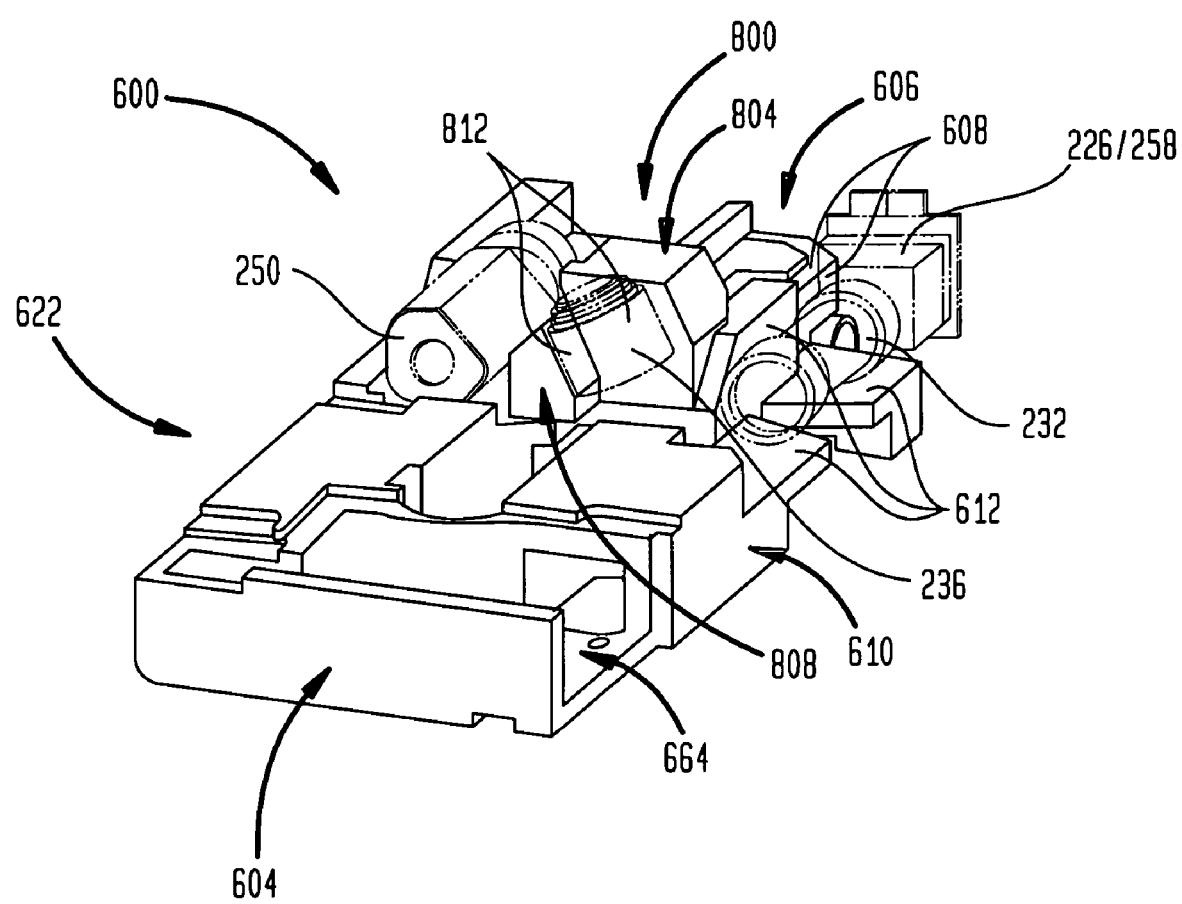
FIG. 10 is a top perspective view of the mounting structure of FIG. 6 showing some of the holographic drive head components, subassemblies and mounting block of FIGS. 8-9 mounted thereon.
Figure 11:
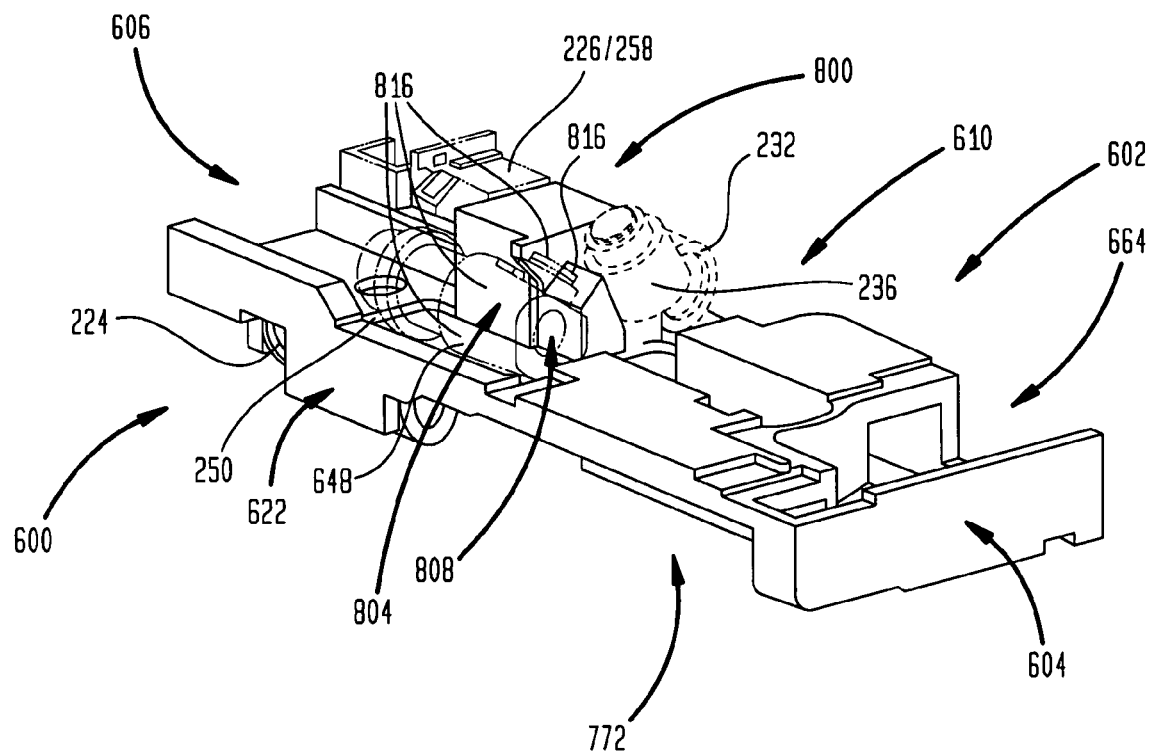
FIG. 11 is a different top perspective view of the mounting structure of FIG. 10 showing the holographic drive head components, subassemblies and mounting block of FIGS. 8-9 mounted thereon.
Figure 12:
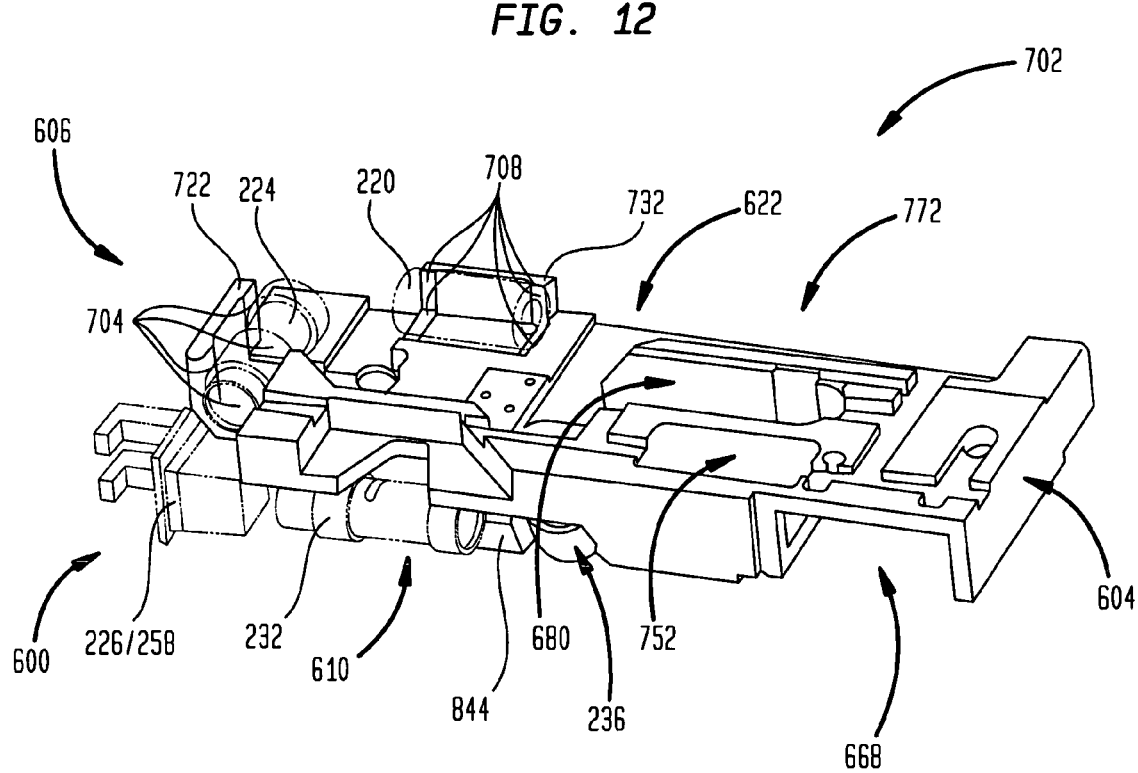
FIG. 12 is a bottom perspective view of the mounting structure similar to that of FIG. 7 showing the holographic drive head components and subassemblies mounted thereon.

FIGS. 10-12 illustrate how the various components and/or subassemblies of the holographic drive head may be mounted on structure 600. Referring to FIGS. 10-11, SLM/PBS subassembly 226/258 (see FIG. 2A) may be mounted at mounting location 608, with surfaces 624 and 628 referencing and orienting subassembly 226/258 in the proper optical alignment. Relay lens subassembly 232 (see FIG. 2A) may be mounted at mounting location 612, with surfaces 632, 634 and 636 referencing and orienting subassembly 232 in the proper optical alignment. Mounting block 800 is mounted by bottom surface 860 on reference surface 640 at mounting location 616, with mounting block locating surfaces 848 and 854 adjacent or abutting respective vertical surfaces 642 and 644 of mounting location 616 so that mounting block 800 and its respective mounting locations 812 and 816, along with respective reference surfaces 820, 824, 828, 830, and 834, are properly oriented. Storage lens subassembly 236 (see FIG. 2A) may be mounted at mounting location 808 with surfaces 820 and 824 referencing and orienting subassembly 236 in the proper optical alignment. Scanner lens subassembly 250 (see FIG. 2A) may be mounted at mounting locations 620 and 816 with surfaces 648, 828, 830, and 834 referencing and orienting subassembly 250 in the proper optical alignment, including proper optical alignment with respect to subassembly 236. Slanted surfaces 824 and 834 generally control the angle at which scanner lens subassembly 250 and storage lens subassembly 236 are oriented with respect to each other so that reference beam 280 transmitted from scanner lens subassembly 250 and data beam 282 transmitted from storage lens subassembly 236 may interfere to form holograms. Alternatively, and in place of mounting block 800, storage lens subassembly 236 and scanner lens subassembly 250 may be mounted on structure 600 using mounting 524 and associated pairs of rails 570/574 and 580/584 shown in FIG. 5.

Referring to FIG. 12, relay lens subassembly 224 (see FIG. 2A) may be mounted at mounting location 704, with surfaces 712, 714, 716 and 720 referencing and orienting subassembly 224 in the proper optical alignment. Data expander subassembly 220 (see FIG. 2A) may be mounted at mounting location 708, with surfaces 726, 730, 734, 736, 738, and 742 referencing and orienting subassembly 220 in the proper optical alignment. As further shown in FIGS. 10-12, adjacent pairs of subassemblies may be oriented so as to be non-coaxial, for example adjacent subassembly pairs 236 and 232, adjacent subassembly pairs 226/258 and 224, and adjacent subassembly pairs 224 and 220. With regard to subassembly pair 236 and 232 pair, a pair of adjustable mirrors may be positioned between subassembly 236 and 232.

Description of Spatial Light Modulator, Beam Splitter and Detector Array (e.g., Camera) Subassembly Alignment and Physical/Imaged Aperture for Spatial Light Modulator Embodiments of the present invention also relate to an aligned subassembly comprising a spatial light modulator (SLM), a (e.g., polarizing) beam splitter and a detector array (e.g., camera). Holographic data storage systems, such as HMS 200 of FIG. 2A, may require the precise alignment of the detector array (e.g., camera) in multiple directions of freedom to attain the necessary optical and mechanical relationship with the SLM. Optically and mechanically aligning an SLM and a detector array (e.g., camera) with a common adjacent component, such as a polarizing beam splitter (PBS), independent of the alignment of the remaining holographic drive head components and/or subassemblies may be difficult to achieve. This alignment procedure may be time consuming and necessitate complicated hardware to attain the level of adjustment and alignment needed. In addition, eliminating the need to actively align the detector array (e.g., camera) may also be desirable. See commonly assigned U.S. Patent Application 2005/0286388 (Ayres et al.), published Dec. 29, 2005.

In embodiments of the present invention, the aligned relationship (e.g., mechanical and optical) between the SLM and the detector array (e.g., camera), as well as a common adjacent beam splitter (e.g., PBS), may be controlled with minimal or no need for active adjustment. For example, the SLM may be attached to a mount that may precisely control the relationship between the SLM and the PBS, or an intermediary mounting component between the SLM and the PBS. Mounting surfaces may be commonly controlled to within 0.0005" to maintain the proper relationships. This may be achieved, for example, by inserting microspheres into a bonding agent used to join the SLM and PBS together as a partial subassembly. This partial SLM/PBS subassembly may then be attached to the detector array (e.g., camera), for example, by either attaching the camera directly to the PBS or by using an intermediate mounting component(s) (e.g., mounting blocks) between the PBS and the camera. This unitized SLM/PBS/camera subassembly may provide the SLM and camera as a single unit which is aligned and ready to be integrated into the holographic drive head assembly. In addition, if the SLM and/or camera should require replacement because of malfunction, failure, damage, etc., it may be possible to remove the old SLM/PBS/camera subassembly and replace it with a similar (new) SLM/PBS/camera subassembly with minimal or no adjustment or alignment required.

Figure 13:
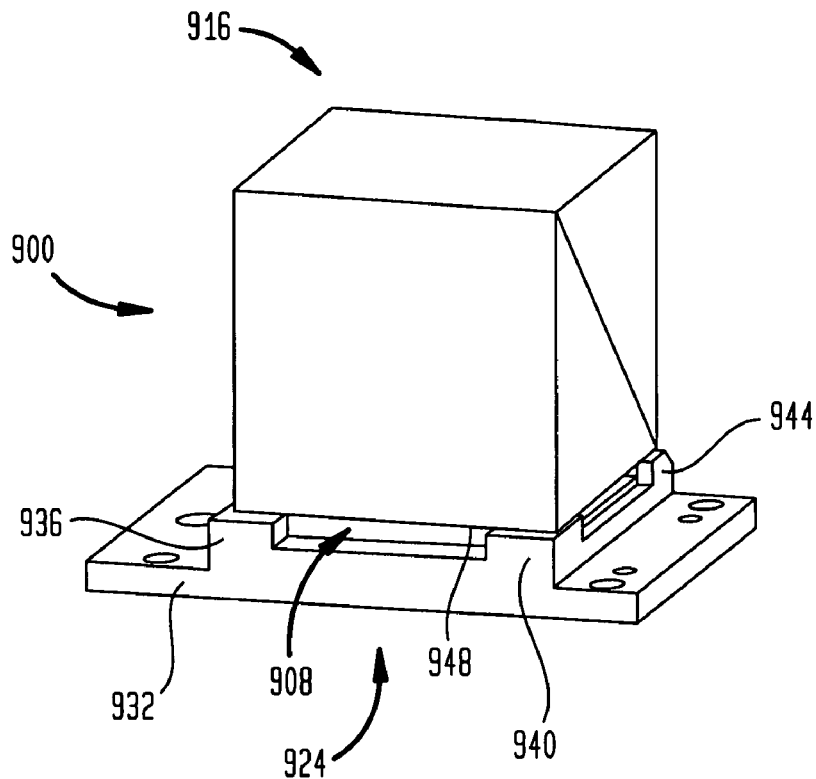
FIG. 13 is a perspective view of an embodiment of a partial subassembly according to the present invention of a passively aligned spatial light modulator (SLM) and a polarizing beam splitter.
Figure 14:
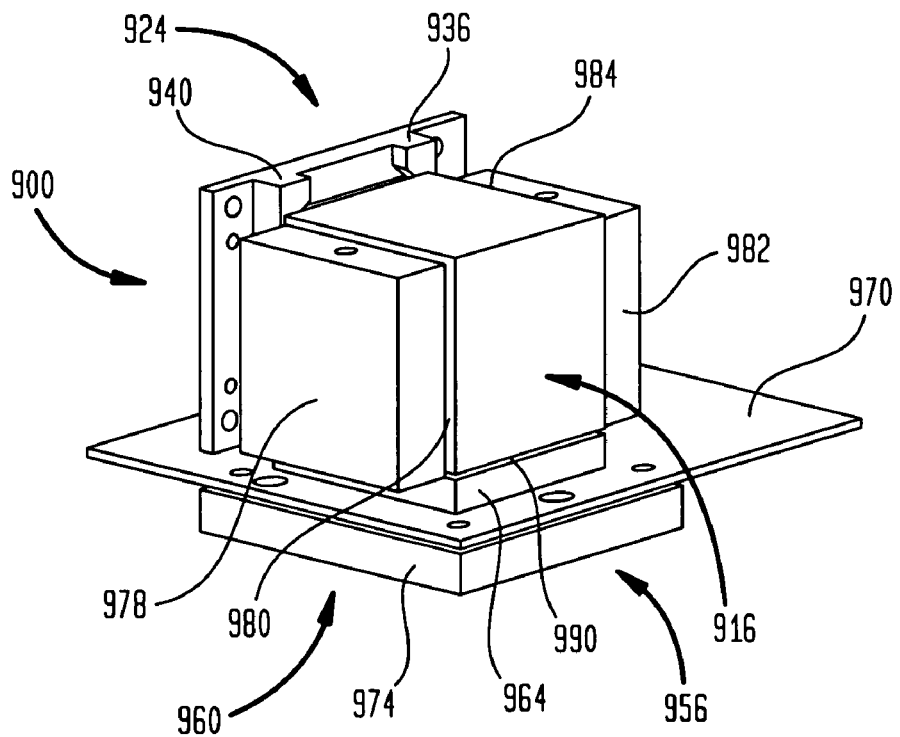
FIG. 14 is a perspective view of an embodiment of a completed subassembly according to the present invention of a passively aligned spatial light modulator (SLM), polarizing beam splitter and camera.

An embodiment of the SLM/PBS/camera subassembly according to the present invention is illustrated in FIGS. 13-14. Referring to FIG. 13, a partial subassembly, indicated generally as 900, comprising the SLM, indicated generally as 908, and a generally cube-shaped PBS, indicated generally as 916, is shown. A passive SLM mounting structure in the form of a pedestal, indicated generally as 924, may be provided for housing SLM 908, and may also comprise the circuit or circuit board for powering or activating SLM 908. SLM mounting pedestal 924 may be provided with a base, indicated generally as 932, and a plurality of mounting members in the form of four spaced apart mounts arranged in a generally square-shaped configuration and extending outwardly from base 932, three of which are shown in FIG. 13 and are indicated as 936, 940 and 944. As shown in FIG. 13, one face of PBS 916, indicated as 948, may be mounted, attached, secured, etc., to mounts 936, 940 and 944 (for example, through the use of a bonding agent or adhesive), so that adjacent and opposing face 948 of PBS 916 is joined to SLM 908 to form partial subassembly 900 comprising SLM 908 and PBS 916.

Referring to FIG. 14, partial SLM/PBS subassembly 900 is attached, secured, etc., to the camera subassembly, indicated generally as 956, to form the completed SLM/PBS/camera subassembly, indicated generally as 960. Camera subassembly 956 comprises a camera 964, a circuit board 970 to which camera 964 is attached, mounted, secured, etc., for powering or activating the camera 964, and a means for associating camera subassembly 956 to partial SLM/PBS subassembly 900 in the form of a camera PCB stiffening frame 974 attached to the circuit board 970. A pair of passive mounting blocks may also be provided, one of which, indicated as 978, is attached (e.g., by adhesive or bonding agent) to face 980 of PBS 916, the other of which, indicated as 982, is attached (e.g., by adhesive or bonding agent) to the opposite face 982 of PBS 916. Mounting blocks 978 and 982, together, may be used to mount, attach, secure, etc., PBS 916 of SLM/PBS subassembly 900 to camera frame 974 of camera subassembly 956 by means of, for example, fasteners, etc. (not shown) to form unitized SLM/PBS/camera subassembly 960. Face 990 of PBS 916 (which is perpendicular to face 948 positioned adjacent to and opposing SLM 908, as well as opposing faces 980 and 984) is positioned adjacent to and opposing camera 964 such that SLM 908 and camera 964 (as well as camera subassembly 956) are optically and mechanically aligned with respect to PBS 918 and with respect to each other. Alternatively, face 990 of PBS 916 of SLM/PBS subassembly 900 may be directly mounted, attached, secured, etc., to camera 964 (e.g., through the use of an adhesive or bonding agent) without the use of mounting blocks 978 and 982.

The SLM/PBS/camera subassembly 960 may be used, for example, in the method and holographic data storage system described in commonly assigned U.S. Patent Application 2005/0286388 (Ayres et al.), published Dec. 29, 2005, the entire disclosure of which is incorporated by reference, to avoid the need for actively controlling the alignment of SLM 908, PBS 916 and especially camera 964 through the use of, for example, microcontrollers, such as 117 and 129. The SLM/PBS/camera subassembly 960 may also be used, for example, in place of separate SLM 226, camera 228 and PBS 258 of HMS 200.

Embodiments of the present invention further relate to a spatial light modulator (SLM) provided with: (1) a physical aperture having high absorption which is positioned over the photoactive area of the SLM; or (2) an imaged aperture projected onto the photoactive area, wherein the physical or imaged aperture reduces reflections in the photoactive area which may, for example, cause degradation of the signal to noise ratio (SNR) of recorded holographic data. Reflections from bonding wires, pads, unused border pixels, etc., may result in unwanted noise signals recorded or written into the recorded holographic data which may degrade the overall SNR of recovered data. Wire bonds and pads may present a constant noise signal by creating off-angle stray light. Unused border pixels may directly contribute to the reduction of the dynamic range of the holographic storage medium because light coming from these border pixels may not be used for image recreation or reconstruction. The problem of illuminated border pixels which do not carry data may be unavoidable when the SLM is based on ferroelectric liquid crystals which must be operated in a DC balanced mode, i.e., when averaged over some time scale (typically from 100 to 1000 milliseconds), each SLM pixel is driven on (bright) and driven off (dark) an equal amount. If this DC balance refresh rate does not coincide or cannot exactly match the recording exposure rate, which may allow the border pixels to alternate between off (dark) during a recording exposure and on (bright) between recording exposures when no light reaches the SLM, then during a significant number of recorded pages, the border pixels may be in an on (bright) state during a significant portion of the recorded holographic data (e.g., as much as half of the recorded pages). This may result in increased light scatter from the border pixels, thereby degrading the signal to noise performance of the system. Also, the border pixels may add coherently, thus creating an unwanted "Direct Current (DC) hot spot" in the holographic medium. The irradiance (intensity) of this DC hot spot may be as much as six orders of magnitude higher than the area surrounding this DC hot spot.

Figure 15:
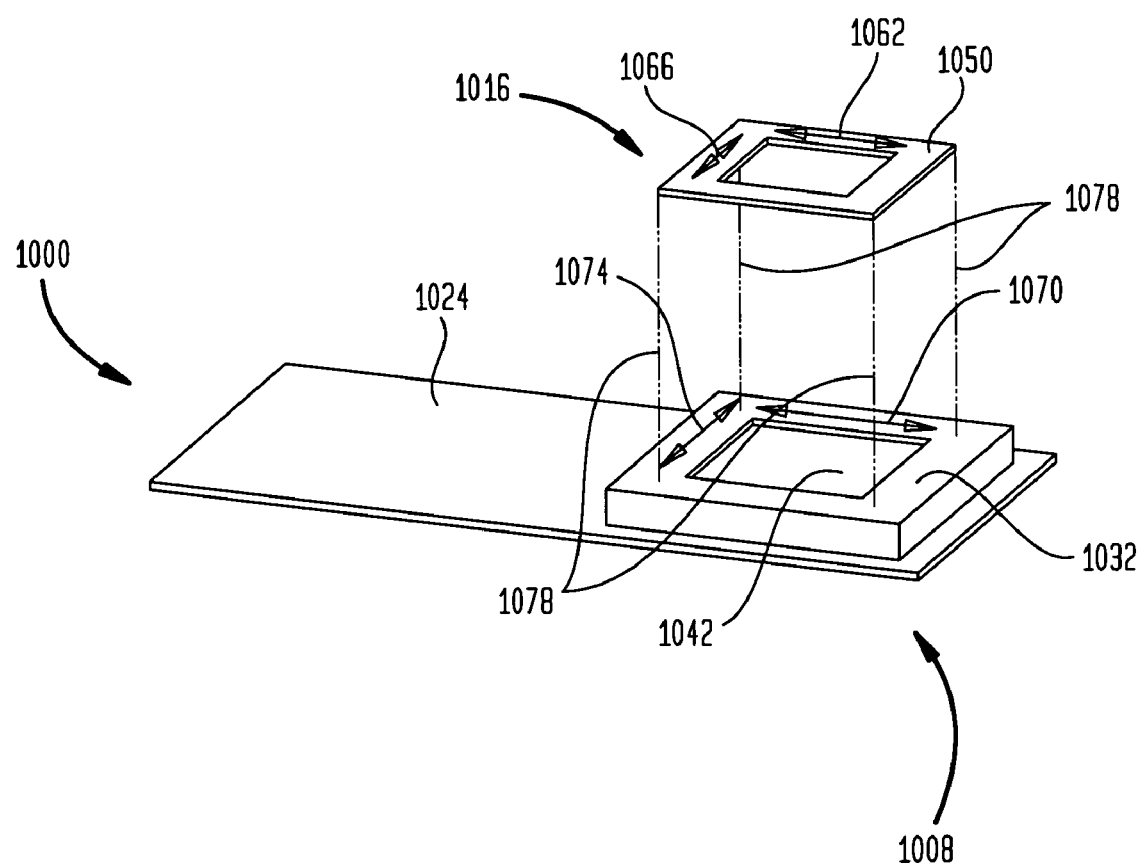
FIG. 15 is a top perspective view showing a high absorption physical aperture which is positioned over the photoactive area of a spatial light modulator.

Positioning a physical aperture having high absorption (e.g., provided by a high absorption coating) over (or imaging an imaged aperture onto) the photoactive area of the SLM may reduce, diminish, lessen, etc., the unwanted light from the recording operation. An embodiment of a subassembly comprising the combination of a physical aperture associated with the SLM is illustrated in FIG. 15 and is indicated generally as 1000. As shown in FIG. 15, subassembly 1000 comprises an SLM subassembly, indicated generally as 1008, and a physical aperture element, indicated generally as 1016. SLM subassembly 1008 comprises an SLM circuit board, indicated generally as 1024, and an SLM, indicated generally as 1032, which is powered or activated by board 1024. SLM 1032 has a photoactive area 1042 (shown in FIG. 15 as having a rectangular or square shape but which may have other shapes) which defines the optically active portion of SLM 1032 and which often has a cover made, for example, from glass.

Aperture element 1016 may comprise an aperture frame 1050 (shown in FIG. 15 as having a generally rectangular or square shape but which may have other shapes, often depending on the shape of photoactive area 1042) having a physical aperture 1058 formed therein and covered with, for example, glass having thereon a high absorptive material, a thin sheet of steel coated with black oxide, etc. Aperture element 1016 may be relatively thin, for example, having a thickness of from about 0.005 to about 0.1 inches, more typically from about 0.025 to about 0.075 inches. The shape of aperture 1058 may be of the same general shape as photoactive area 1042 (e.g., a generally rectangular shaped, a generally square shape, etc.), or may have a different shape (e.g., a generally circular shape, including a generally circular shape with parallel chords defining parallel straight edges and alternating arcs having equal radii and coincident centers of curvature, a generally octagonal shape, including a generally octagonal shape comprising four alternating edges in the form of arcs having equal radii and coincident centers of curvature, etc.) depending on the imaging capabilities of the optical system (e.g., relay lens 224) and the desired size and shape of the data page to be recorded. The dimensions of aperture 1058, i.e., in length and width, as indicated respectively by double headed arrows 1062 and 1066, may be such that aperture 1058 may have exactly the same dimensions as photoactive area 1042, i.e., in length and width, as indicated respectively by double headed arrows 1070 and 1074, up to being slightly larger in dimensions (e.g., oversized by a few pixels). As indicated by broken lines 1078, aperture element 1016 may be placed or positioned over or on SLM 1032 so that aperture 1058 is over and aligned with photoactive-area 1042. Frame 1050 of aperture element 1016 may be secured, attached, mounted, etc., to SLM 1032 by using low force mechanical mount, an adhesive, etc. Once aperture element 1016 is secured, attached, mounted, etc., to SLM 1032, the resultant combination 1000 may only reflect light from pixels within the exposed area by aperture 1058, thus reducing, diminishing, lessening, eliminating, etc., stray light, border light, etc., that does not contribute to data decoding by SLM 1032.

Description of Alignment and Replacement of Primary Laser

The embodiments of the present invention also relate to alignment of the primary laser (e.g., laser 204 of FIG. 2A) used in a holographic drive head assembly when the primary laser is newly installed in the system either during initial manufacture of the system, or after the primary laser is replaced with a new laser. Because of laser failure, malfunction, damage, etc., it may be necessary to replace the primary laser in a holographic drive head assembly. Because the primary laser is normally the first optical component in a linked chain of optical components and/or subassemblies, replacing the original laser with a new laser may require the realignment of all of the components or subassemblies in the holographic drive head assembly. Such alignment may be a very time consuming task.

Alignment of the original or replacement primary laser with respect to the optical path (e.g., optical path 112 of FIGS. 1 and 2A) may be achieved, and in the case of a replacement laser, without the need to align other components and/or subassemblies that come after the laser in the holographic drive head assembly, by using one or more embodiments according to the present invention, In one embodiment for optically aligning the laser with respect to the optical path, a pair of independent optical path bending or altering elements (e.g., reflectors, mirrors, prisms, mirrored prisms) may be inserted or positioned in the optical path after the laser and before the next optical component or subassembly in the optical path (e.g., main expander assembly 212 of FIG. 2A). Use of the pair of optical path bending or altering elements enables the laser beam to be oriented so that any misalignment may be corrected for.

In another embodiment, a spatial filter having associated therewith a pinhole through which light generated by the laser may pass may be used, wherein the amount of light passing through the pinhole is used to determine the optical alignment of the laser with respect to the optical path. Alignment of an original or replacement laser in a holographic drive head assembly may be further simplified by using the feedback from a spatial filter pinhole (e.g., the combination of lens 274 and pinhole 206 shown in FIG. 2A). The spatial filter pinhole may require that the laser input be within about 10 arc seconds of the replaced (original) laser position to allow light to pass through. Such alignment tolerances may be achieved through optimization of the amount of light passing through the pinhole by adjusting two optical components or subassemblies immediately after the laser in the optical path. By performing this optimization, the pointing location of the replacement (new) laser may be very close to the replaced (original) laser that the components and/or subassemblies of the system were initially aligned to. In particular, the spatial filter pinhole may be used to characterize the quality of the alignment.

Figure 16:
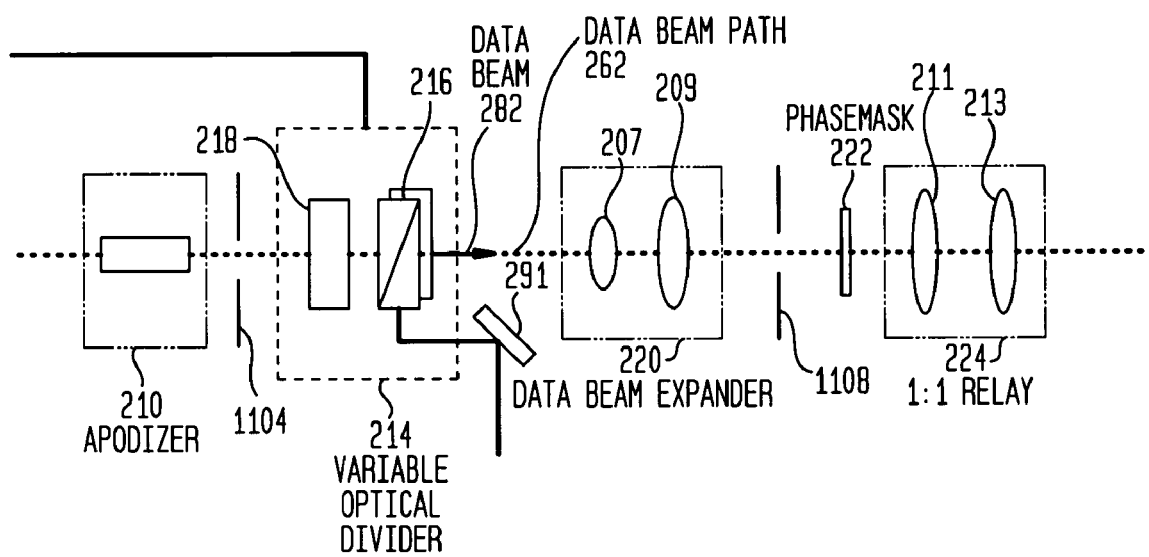
FIG. 16 is a portion of the block diagram of FIG. 2A illustrating potential locations for laser alignment elements according to an embodiment of the present invention.

In another embodiment which may be used separately or in conjunction with a spatial filter pinhole, one or more alignment apertures may be inserted or positioned in the optical path to facilitate alignment of the original laser with respect to the optical path, or a replacement laser relative to the existing alignment of the optical components and/or subassemblies. These alignment apertures may define an optical path originally created by the replaced (original) laser. Potential placement locations for two alignment apertures which are axially spaced along the optical path in HMS system 200 (see FIG. 2A) is illustrated by FIG. 16 which shows a portion of system 200 of FIG. 2A. In FIG. 16, one alignment aperture, indicated as 1104, may be positioned after apodizer 210 and before variable optical divider 214. The other alignment aperture, indicated as 1108, may be positioned after variable optical divider 214, e.g., in data beam path 262 after data beam expander 220 and before phasemask 222. Other placement locations for alignment apertures 1104 and 1108 may also be used, as well as more than two alignment apertures, in aligning a new or replacement laser. The alignment apertures 1104 and 1104 may also be removed from and then reinserted into the optical path as needed.

By determining how much light gets through the two alignment apertures, for example, alignment apertures 1104 and 1108, and by maximizing this throughput, positioning and alignment of the replaced (original) laser may be duplicated. In an alternative embodiment, if the two alignment apertures are appropriately sized, a detector array (e.g., a camera) may be positioned after the alignment apertures used to evaluate the relative alignment of the zeroth-order (or greater) of the diffraction pattern of the first alignment aperture (often referred to as "the Airy disc") within the diffraction pattern created by the second alignment aperture. In practice, this alternative embodiment is similar to aligning a spot or bullseye pattern (i.e, the diffraction pattern of the first alignment aperture) within the center of a second bullseye pattern (i.e, the diffraction pattern of the second alignment aperture), and may be particularly sensitive and capable of a micron-level positional resolution and an angular resolution limited by the effective distance between the two alignment apertures.

Figure 17:
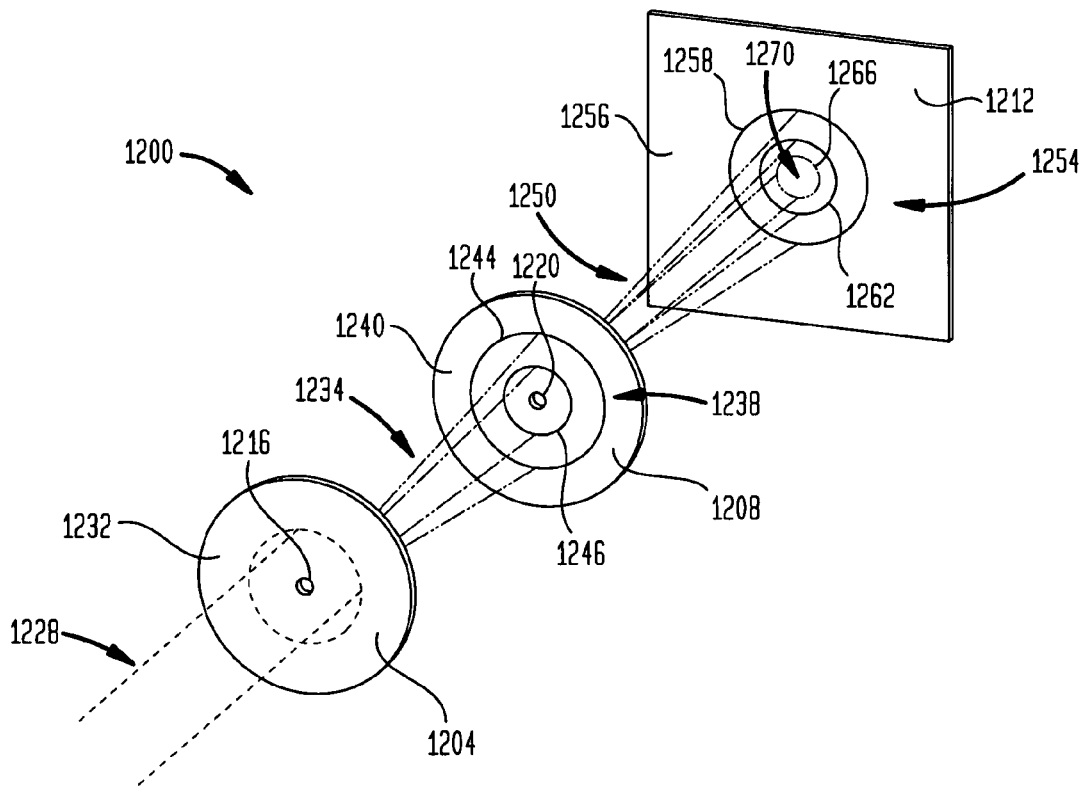
FIG. 17 is a schematic view illustrating the embodiment of FIG. 16 for aligning the primary laser using two alignment elements, each having an alignment aperture.

This alternative laser alignment system is illustrated schematically in FIG. 17, and is indicated generally as 1200. As shown in FIG. 17, alignment system 1200 comprises a first generally circular alignment element 1204, a second generally circular alignment element 1208 which is axially spaced from first alignment element 1204 along the optical path and which may be generally coaxial or aligned with first alignment element 1204, and a detector such as camera 1212 which is axially spaced from second alignment element 1208 along the optical path and which generally aligned with second alignment element 1208. First alignment element 1204 has a generally centered first alignment aperture 1216, while second alignment element 1208 has a generally centered second alignment aperture 1220. First alignment aperture 1216 and second alignment aperture 1220 are generally aligned and coaxial with each other along the optical path. In fact, first alignment element 1204, second alignment element 1208 and detector 1212 may comprise a unitary assembly, which may also be removed from and then reinserted into the optical path as needed.

In operation, a collimated input beam, indicated generally as 1228, generated by the laser strikes surface 1232 of first alignment element 1204. Only a portion of the light, indicated generally as 1234, exits through and is diffracted by first alignment aperture 1216. A first set of concentric diffractions rings, indicated generally as 1238, are thus formed on surface 1240 of second alignment element 1208, comprising at least an outer second-order diffraction ring, which is indicated generally as 1244, and an inner first order diffraction ring, which is indicated generally as 1246 being a. The diameter of second alignment aperture 1220 is sized so that the portion of light, indicated as 1250, comprising at least a portion of the first order diffraction ring 1246 and the light forming zeroth-order diffraction ring 1266 is transmitted through the second alignment aperture 1220 of alignment element 1208. Some of the light 1250 exiting through second alignment aperture 1220 also diverges and forms second set of concentric diffractions rings, indicated generally as 1254, on reaching surface 1256 of camera 1212, which comprises at least an outer second-order diffraction ring, which is indicated generally as 1258, a middle first-order diffraction ring, which is indicated generally as 1262, and an inner the zeroth-order diffraction ring, which is indicated generally as 1266. The alignment of at least the zeroth-order diffraction ring 1266 with respect to the center point, indicated as 1270, of ring 1266 is used to determine the alignment of the laser generating input beam 1228.

In using alignment system 1200, it may be necessary to temporarily remove one or more components and/or subassemblies (e.g., data beam expander 220 of FIG. 2A) from the optical path of input beam 1228 in order properly position system 1200 while aligning the replacement (new) laser. In other words, alignment elements 1204 and 1208, as well as camera 1212, may be removable in such a way that the positioning of elements 1204 and 1208 is repeatable when removed and repositioned, and thus may be positioned in the optical path only when performing a laser alignment. Alternatively, input beam 1228 or a portion thereof may be temporarily diverted from the optical path of the holographic drive head assembly so that beam 1228 (or a portion thereof) enters alignment system 1200.

In another embodiment, a portion of the light generated by the laser may be diverted or split off to provide a monitoring beam, with the monitoring beam being used to determine whether the laser is optically aligned or pointing correctly. The primary laser (e.g., laser 204 of FIG. 2A) of a holographic drive head assembly may be susceptible to pointing errors. Changes in ambient temperature, laser wavelength, laser current, etc., may cause such laser pointing errors which may result in the holographic memory system not working properly. Accordingly, it may be necessary to monitor the pointing of the laser, as well as to maintain the pointing of the laser in the proper position.

In monitoring laser pointing, a beam splitter, such as, for example, a window prism, or other pellicle type optical component, may be used to split off a portion of the laser beam to provide a monitoring beam. This monitoring beam may then be analyzed for any pointing discrepancies, errors, etc. The device for analyzing such pointing discrepancies, errors, etc., may be a photodetector, a bi-cell detector, a quad-cell detector, etc. Alternatively, a detector used in the holographic memory system, for example, camera 228 of FIG. 2A, may be used to monitor the laser pointing.

Monitoring of laser pointing may also be used in conjunction or combination with other components (e.g., eletromechanical or electro-optical actuators) to actively compensate or adjust for any laser pointing errors that may be caused by temperature, wavelength, laser current, etc. For example, one or more path altering or bending components (e.g., mirrors, prisms, etc.) located in the optical path after the laser but before the spatial filter (e.g., lens 274 of FIG. 2A) may be controlled, for example, by a servo to maintain the correct laser pointing. A servo loop may be used to optimize laser pointing whenever the holographic drive head assembly is not recording or reading a hologram so as to avoid affecting data transfer rates.

The embodiments of the present invention also relate to a new light source subassembly which may be used in a holographic drive head assembly. The variability of beam dimensions generated by a laser used in a holographic drive head assembly may be a problem. The output beams of many lasers used for such assemblies may have spatial intensity variations or "noise" which is undesirable because it may lead directly to a decreased signal to noise ratio (SNR) in the reconstructed data. Variability of beam dimensions may be especially significant when a laser diode is used as the light source because laser diodes may have especially larger variations in their beam properties, particularly the elliptical beam divergence angles. Beam uniformity may be required if uniform illumination of any data page is needed, such as may be imposed on the data beam by a spatial light modulator (SLM). It may therefore be necessary to spatially filter such laser beams in order to improve beam uniformity.

One method of spatially filtering a laser beam involves focusing the laser bean so as to pass through a small pinhole (e.g., pinhole 206 of FIG. 2A), which may remove high spatial frequencies which may comprise the unwanted noise. For a pinhole spatial filter such as 206, the size of the pinhole may be very small, e.g., in the range from 5 to 25 microns, which may require precise alignment and robust positional stability over time and over a range of operating temperatures, and during or after the occurrence of motion effects (e.g., vibrations, shocks, impacts, etc.). Such alignment stability may be difficult to achieve.

As previously alluded to, replacement of a laser may require lengthy and time-consuming procedures to ensure that the beam generated by the replacement laser is aligned angularly and translationally correct, and if the generated beam size varies from unit to unit, to set any necessary magnifications in the system, and to check the resulting system wavefront. It may also be necessary to optically isolate the laser from any strong optical reflections which may cause instability in the laser power and spectral mode (e.g., wavelength). The problem of variability of beam dimensions previously alluded to may also be especially significant when a laser diode is used as the light source because laser diodes have an especially large variation in their beam properties, particularly with regard to the elliptical beam divergence angles.

This problem may be solved by using a light source subassembly comprising a laser, a fiber coupling (focus) lens connected to the laser; and an optical fiber connected to the fiber coupling lens and having a fiber connector ready output end. The optical fiber may be a single-mode optical fiber and may also be a polarization-maintaining optical fiber. The fiber connector ready output end may be an angled-type PC (APC) type of fiber connector. For shorter visible wavelengths, the fiber core may comprise a material which does not suffer unwanted absorption or other nonlinear loss mechanisms, such as stimulated brillouin scattering, especially when optical powers and hence fiber power densities are high for the holographic memory system (e.g., >50 mW laser power).

Use of a light source subassembly comprising a laser, a fiber coupling (focus) lens; and an optical fiber having a fiber connector ready output end provides several advantages. The output beam divergence angle of an optical fiber is determined by the numerical aperture of the light beam focused on the input end of the optical fiber, as well as limited by the fiber's properties (core and cladding dimensions and materials). This light source subassembly may be designed and adjusted so that the output of the optical fiber has consistent laser beam parameters, and therefore holographic drive heads using this light source subassembly may be identical, thus requiring less time to assemble and align compared to systems requiring variable magnification inside the holographic drive head.

In addition, a single-mode optical fiber only allows propagation of the fundamental mode of the fiber. High spatial frequency noise in typical laser outputs represent higher order fiber modes which may not propagate in a single-mode fiber, potentially resulting in a pure spatially filtered (Gaussian) beam being emitted from the fiber. The optical fiber thus performs the same beam filtering effect as a spatial filter but, by taking advantage of fiber coupling techniques with high mechanical stability, mechanical stability problems of free-space lenses and a pinhole may be avoided.

Using an optical fiber having a fiber connector ready output end also enables extremely rapid and simple replacement of a laser in a holographic drive head. Such fiber connectors may have very precise repeatability such that when the new light source subassembly is installed and fiber connector connected to the remainder of the holographic drive head assembly, no further alignment may be necessary. Use of angled fiber connectors (such as the APC-type), or angled fiber faces, may ensure that very little light reflects back to the laser. At the fiber input end, the reflection from the fiber face may be angled sufficiently such that an insubstantial amount of power is collected by the focusing lens and hence is unavailable to cause instability in the laser. Also, internal reflections from the output fiber face may be beyond the collection NA of the fiber, may not achieve total internal reflection, and therefore may not significantly propagate back toward the input end of the fiber. Careful design of the rest of the optical system, for example, tilting all transmissive planar optics (e.g. cube polarizing beam splitters, internal turning prisms, etc.) so that incident light is not retroreflected back towards the laser may ensure that sufficiently low power levels couple back into the fiber which may potentially interfere with the stability of the laser.

Figure 18:
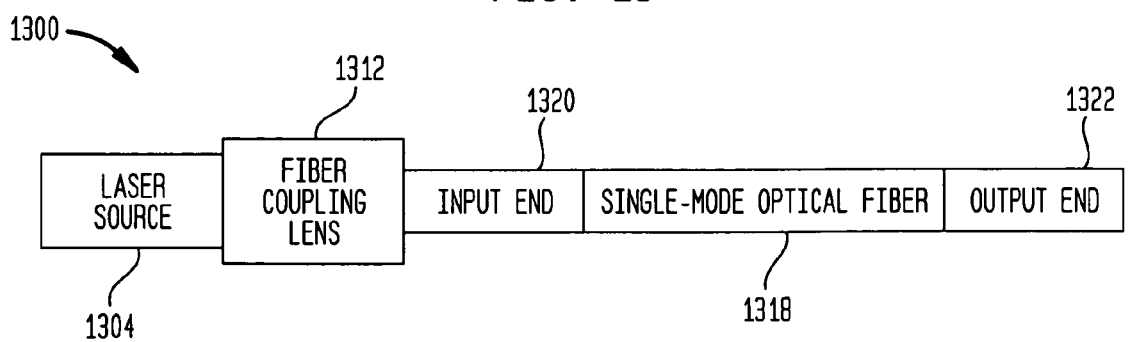
FIG. 18 is a schematic illustration of a laser light source subassembly according to an embodiment of the present invention.

An embodiment of this laser light source subassembly is illustrated in FIG. 18, and is generally referred to as 1300. Subassembly 1300 comprises a laser source, indicated generally as 1304, which may be a conventional laser or a laser diode. Subassembly 1300 further comprises a fiber optics coupling lens, indicated generally as 1312 which is connected to laser source 1304. Subassembly 1300 further comprises an optical fiber (e.g., a single-mode optical fiber), indicated generally as 1318, which has an input end 1320 which is connected to fiber optics coupling lens 1312. Optical fiber 1318 further comprises a fiber connector ready output end 1322.

Figure 19:
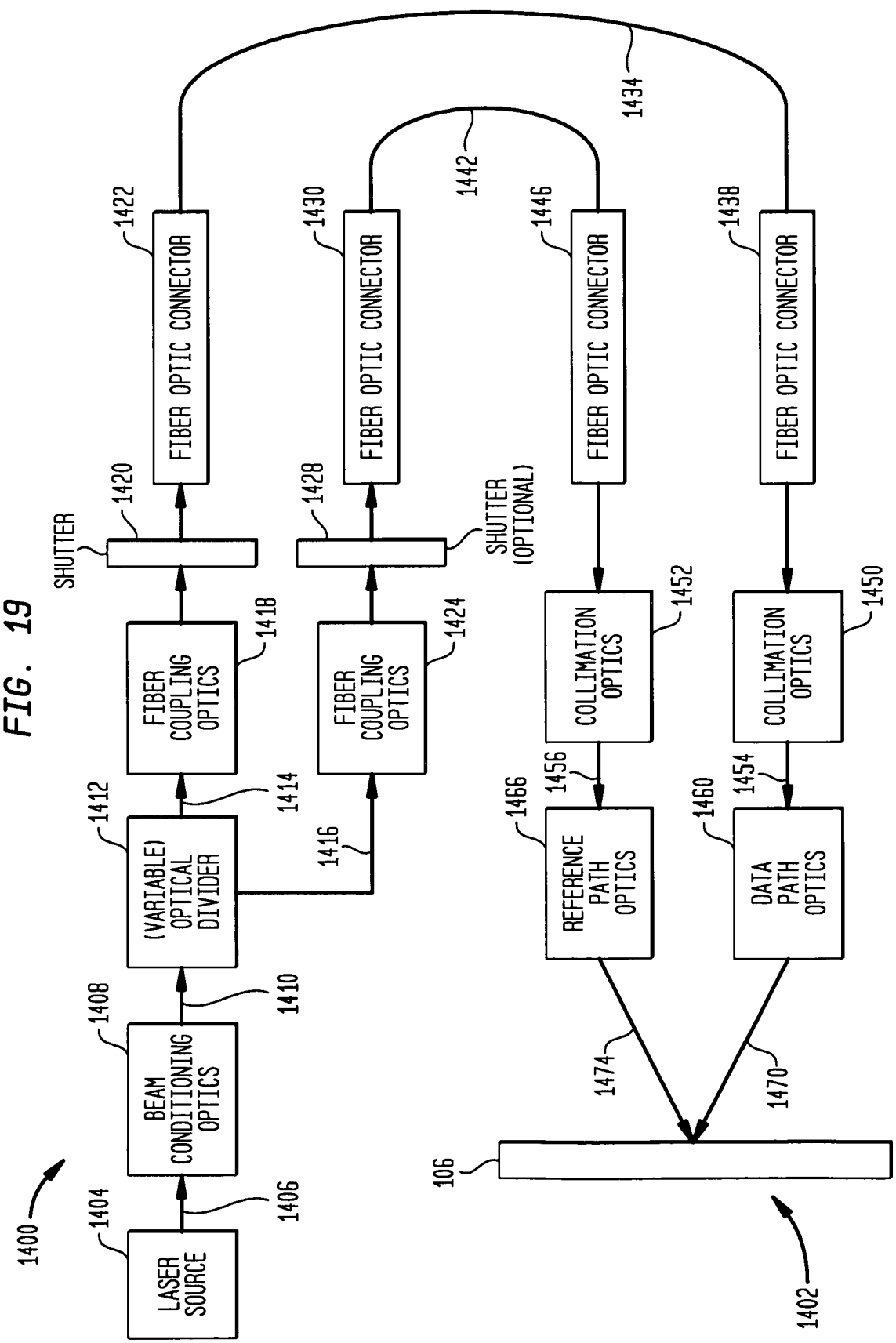
FIG. 19 is a schematic block diagram of an embodiment of a fiber optic coupled laser light source subsystem according to the present invention which may be used in the holographic memory system illustrated in FIG. 2A.

FIG. 19 is a schematic illustration of an embodiment of a fiber optic coupled laser light source subsystem, which is generally referred to as 1400, and which may be used in, for example, HMS system 200 illustrated in FIG. 2A, and which is generally referred to in FIG. 19 as 1402. As shown in FIG. 19, subsystem 1400 comprises as laser source, indicated generally as 1404, which generates a light beam, indicated as 1406, which is then transmitted to the beam conditioning optics, indicated generally as 1408, of subsystem 1400. The conditioned beam 1410 from beam conditioning optics 1408 may be transmitted to a variable optical divider (e.g., including a beam splitter such as 216 shown in FIG. 2A), indicated generally as 1412, of subsystem 1400 wherein conditioned beam 1410 is divided into a data beam, indicated generally as 1414, and a reference beam, indicated generally as 1416. Data beam 1414 may be transmitted to and received by fiber coupling optics, indicated generally as 1418, and focused through a shutter 1420 onto the input end of a fiber optic connector, indicated generally as 1422. Similarly, reference beam 1416 may be transmitted to and by received by fiber coupling optics, indicated generally as 1424, and focused through an optional shutter 1428 onto the input end of a fiber optic connector, indicated generally as 1430. Data beam 1414 may then be transmitted through a fiber optic cable, indicated generally as 1434, which is terminated at one end by fiber optic connector 1422 and at the other end to a fiber optic connector, indicated generally as 1438, which represents the end of subsystem 1400. Similarly, reference beam 1416 may be transmitted through a fiber optic cable, indicated generally as 1442, which is terminated at one end to fiber optic connector 1430 and at the other end to a fiber optic connector, indicated generally as 1446. Cables 1434 and/or 1442 may each also be divided in two with mating connectors between each pair of cables.

In an alternative embodiment, a single set of fiber coupling optics 1418, shutter 1420, fiber optic cable 1434 and collimation optics 1350 may be used in optical path 1410 between the beam conditioning optics 1408 and the variable optical divider 1412 to achieve the same or similar results. In this alternative embodiment, a second set of cable 1442, shutter 1428, fiber coupling optics 1424, and collimation optics 1452 would be omitted. Shutters 1420 and/or 1428 may also be positioned before respective fiber coupling optics 1418 and/or 1424, before variable optical divider 1412, etc.

As further shown in FIG. 19, data beam 1414 may be transmitted from cable 1434 via connector 1438 to collimation optics, indicated generally as 1450, while reference beam 1418 may be transmitted from cable 1442 via connector 1446 to collimation optics, indicated generally as 1452. Collimation optics 1450 and 1452 represent the end of subsystem 1400. The collimated data and reference beams 1454 and 1456 are then transmitted from respective collimation optics 1450 and 1452 to respective data beam path optics, indicated generally as 1460, and reference beam path optics, indicated generally as 1466. The resulting data beam 1470 and reference beam 1474 may then be transmitted so as to interfere and thus form holograms which are recorded by holographic medium 106.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A system comprising one or more of the following components for optically aligning or pointing a laser in a holographic drive head assembly with respect to an optical path:
   a pair of optical path bending or altering elements positioned in the optical path after the laser and before the next optical component or subassembly in the optical path, wherein the optical path bending or altering elements bend or alter the optical path between the laser and the next optical component or subassembly in the optical path to thereby optically align the laser with the optical path;
   a spatial filter having associated therewith a pinhole through which light generated by the laser may pass, wherein the amount of light passing through the pinhole is used to determine the optical alignment of the laser with respect to the optical path; one or more alignment apertures positioned in an optical path after the laser, wherein the alignment apertures are used to determine the optical alignment of the laser with respect to the optical path; or means for splitting off a portion of the light generated by the laser to provide a monitoring beam, and means for analyzing the monitoring beam to determine whether the laser is optically aligned or pointing correctly.

2. The system of claim 1, wherein the laser is a replacement laser.

3. The system of claim 1, wherein the components for optically aligning the laser comprise the pair of independent optical path bending or altering elements.

4. The system of claim 3, wherein the pair of independent optical path bending or altering elements is positioned before the main expander assembly in a holographic memory system to bend or alter the optical path between the laser and the main expander assembly to thereby optically align the laser with the optical path.

5. The system of claim 3, wherein the pair of independent optical path bending or altering elements comprise a pair of reflectors.

6. The system of claim 1, wherein the components for optically aligning the laser in the holographic drive head assembly comprise the spatial filter with the associated pinhole, the associated pinhole having a diameter of from about 0.5 to about 1000 micrometers.

7. The system of claim 6, wherein feedback is provided from the spatial filter with the associated pinhole for optically aligning the laser.

8. The system of claim 6, wherein the amount of light passing through the associated pinhole is optimized by adjusting two optical components or subassemblies immediately after the laser in the optical path.

9. The system of claim 6, wherein the associated pinhole has a diameter of from about 5 to about 25 micrometers.

10. The system of claim 1, wherein the components for optically aligning the laser comprise one or more alignment apertures positioned in an optical path after the laser.

11. The system of claim 10, wherein the components for optically aligning the laser comprise two alignment apertures which are axially spaced along the optical path.

12. The system of claim 11, wherein the two alignment apertures can be removed from and reinserted into the optical path.

13. The system of claim 11, wherein one of the alignment apertures is positioned in the optical path before an optical divider in a holographic memory system and wherein the other alignment aperture is positioned in the optical path after the optical divider.

14. The system of claim 11, wherein the components for optically aligning the laser comprise a first alignment element having generally centered first alignment aperture, a second alignment element axially spaced from the first alignment element along the optical path and which is generally coaxial with first alignment element and which has a generally centered second alignment element which is generally aligned and coaxial with the first alignment element along the optical path, and a detector which is axially spaced from the second alignment element along the optical path and which is generally aligned with the second alignment element.

15. The system of claim 14, wherein a portion of collimated light exits through and is diffracted by the first alignment aperture to form a first set of concentric diffractions rings on the second alignment element, and wherein a portion of light exits through the second alignment aperture to form a second set of concentric diffractions rings on the detector, and wherein alignment of the first set of concentric diffraction rings within the second set of concentric diffractions rings is used to optically align the laser.

16. The system of claim 15, wherein the first set of concentric diffractions rings comprises at least an outer first-order diffraction ring and an inner zeroth-order diffraction ring, wherein the second set of concentric diffractions rings comprises at least an outer first-order diffraction ring, an inner zeroth-order diffraction ring and a center point, wherein the second alignment aperture has a diameter sized so that light transmitted through the second alignment aperture forms at least a first-order diffraction ring and wherein the alignment of at least the inner zeroth-order diffraction ring with respect to the center point of at least the inner zeroth-order diffraction ring is used to determine the optical alignment of the laser.

17. The system of claim 14, wherein the first alignment element, the second alignment element and detector comprise a unitary assembly.

18. The system of claim 17, wherein the unitary assembly can be removed from and reinserted into the optical path.

19. The system of claim 14, wherein the detector is a camera.

20. The system of claim 14, wherein the detector is a quad cell.

21. The system of claim 14, wherein the detector is a positioning sensor.

22. The system of claim 1, wherein the components for optically aligning or pointing the laser comprise at least comprise the means for providing the monitoring beam, and the means for analyzing the monitoring beam.

23. The system of claim 22, wherein the monitoring beam providing means comprises a beam splitter.

24. The system of claim 22, wherein the monitoring beam analyzing means comprises a detector.

25. The system of claim 22, wherein the monitoring beam is used to adjust the laser for any laser pointing errors.

* * * * *